US012469376B2

(12) United States Patent
Dittrich et al.

(10) Patent No.: US 12,469,376 B2
(45) Date of Patent: Nov. 11, 2025

(54) DISTANCE-DETERMINING SYSTEM, CONTACT-MONITORING SYSTEM, CONTACT-TRACKING SYSTEM AND METHOD FOR DETERMINING DISTANCE AND/OR TRACKING CONTACT

(71) Applicant: ETO MAGNETIC GmbH, Stockach (DE)

(72) Inventors: Lutz Dittrich, Immenstaad (DE); Walter Naumann, Immenstaad (DE)

(73) Assignee: ETO MAGNETIC GmbH, Stockach (DE)

( * ) Notice: Subject to any disclaimer, the term of this patent is extended or adjusted under 35 U.S.C. 154(b) by 217 days.

(21) Appl. No.: 18/253,236

(22) PCT Filed: Dec. 22, 2021

(86) PCT No.: PCT/EP2021/087318
§ 371 (c)(1),
(2) Date: Aug. 10, 2023

(87) PCT Pub. No.: WO2022/136560
PCT Pub. Date: Jun. 30, 2022

(65) Prior Publication Data
US 2024/0038051 A1    Feb. 1, 2024

(30) Foreign Application Priority Data

Dec. 23, 2020   (DE) ............... 10 2020 134 920.3
May 14, 2021   (DE) ............... 10 2021 112 613.4

(51) Int. Cl.
*G08B 21/22*       (2006.01)
*G08B 21/02*       (2006.01)
(52) U.S. Cl.
CPC ......... *G08B 21/22* (2013.01); *G08B 21/0258* (2013.01); *G08B 21/0266* (2013.01)

(58) Field of Classification Search
CPC . G08B 21/22; G08B 21/0258; G08B 21/0266
(Continued)

(56) References Cited

U.S. PATENT DOCUMENTS 9,002,372 B2 * 4/2015 Shakespeare ........... G01S 19/14
                                                    455/457
2011/0169654 A1 * 7/2011 Ketari ................. H04W 76/19
                                                    340/687
(Continued)

FOREIGN PATENT DOCUMENTS

DE   102020107972 A1   5/2020
ES        2150370 A1   11/2000
FR        2692363 A1   12/1993

OTHER PUBLICATIONS

European Office Action mailed Nov. 19, 2024 in corresponding European Patent Application 21844705.0 (and English translation).
(Continued)

*Primary Examiner* — Kerri L Mcnally
(74) *Attorney, Agent, or Firm* — Posz Law Group, PLC

(57) ABSTRACT

A distance-determining system, in particular a distance-monitoring system, preferably a unidirectional distance-monitoring system, with at least one first monitoring unit and with at least one second monitoring unit, wherein at least the first monitoring unit includes a transmitter unit that is configured to emit a sound signal, in particular an ultrasound signal, and an electromagnetic signal, in particular an electromagnetic high-frequency signal, wherein at least the second monitoring unit includes a receiver unit that is configured to receive the sound signal and the electromagnetic signal such that a distance between the first monitoring unit and the second monitoring unit can be determined on the basis of the runtime difference between the sound signal (Continued)

Figure 1:
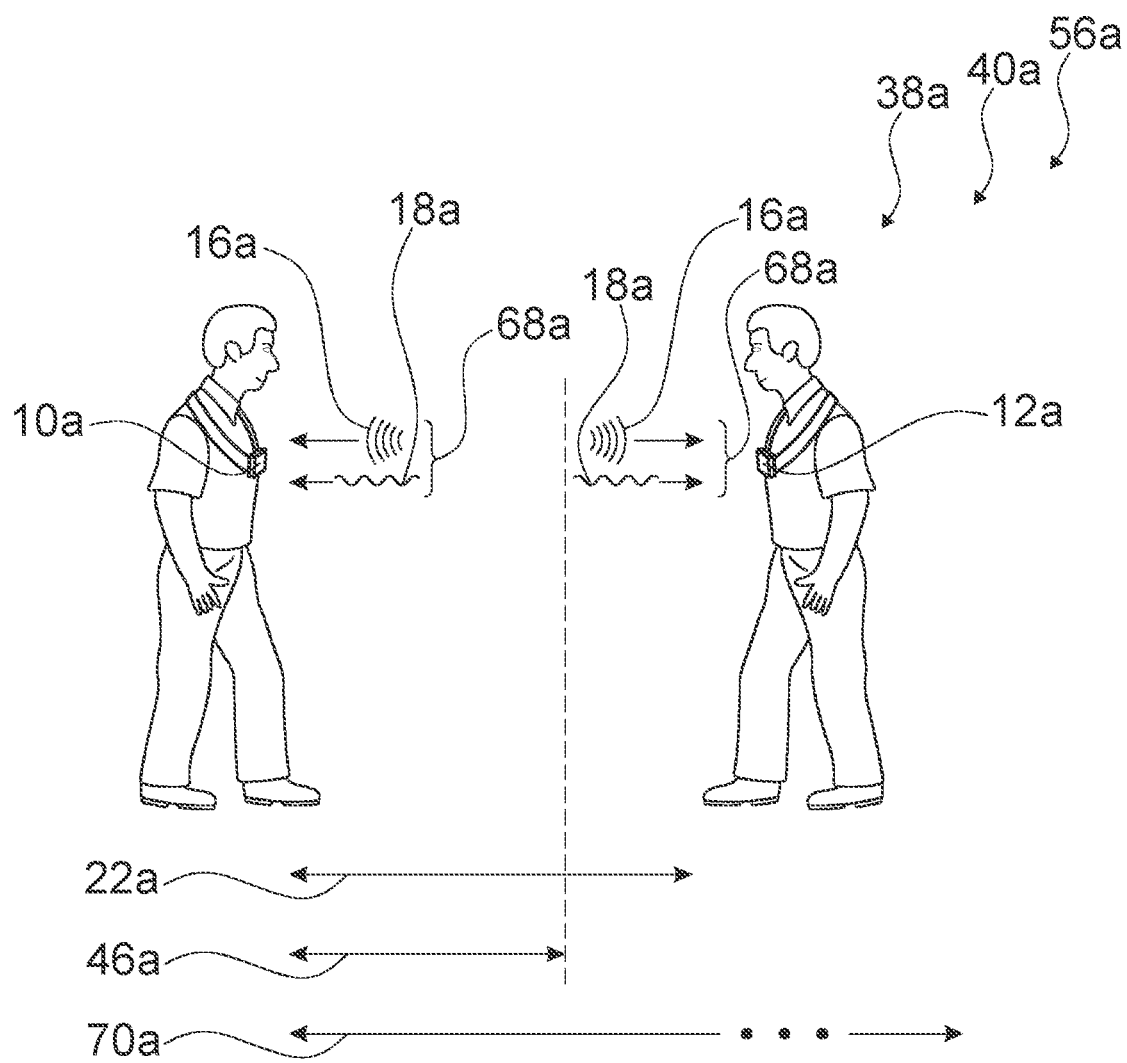

received by the receiver unit and the electromagnetic signal received by the receiver unit and allocated to the received sound signal.

22 Claims, 8 Drawing Sheets

(58) Field of Classification Search
USPC ...................................................... 340/686.6
See application file for complete search history.

(56) References Cited

U.S. PATENT DOCUMENTS

| | | | | |
|---|---|---|---|---|
| 2015/0070134 | A1* | 3/2015 | Nagisetty | G07C 9/28 340/5.61 |
| 2015/0339903 | A1* | 11/2015 | Slavin | G08B 25/008 340/545.2 |
| 2018/0188352 | A1 | 7/2018 | Amir et al. | |
| 2019/0004165 | A1* | 1/2019 | Kwon | G01S 11/16 |
| 2020/0380178 | A1 | 12/2020 | Santarone et al. | |

OTHER PUBLICATIONS

German Search Report mailed Nov. 17, 2021 in counterpart German Patent Application No. 10 2021 112 613.4 (and English translation).
International Search Report of the International Searching Authority mailed May 2, 2022 in corresponding International Application No. PCT/EP2021/087318.
International Preliminary Report on Patentability of the International Searching Authority mailed Jun. 13, 2023 and Written Opinion of the International Searching Authority mailed May 2, 2022 in corresponding international application PCT/EP2021/087318.

* cited by examiner

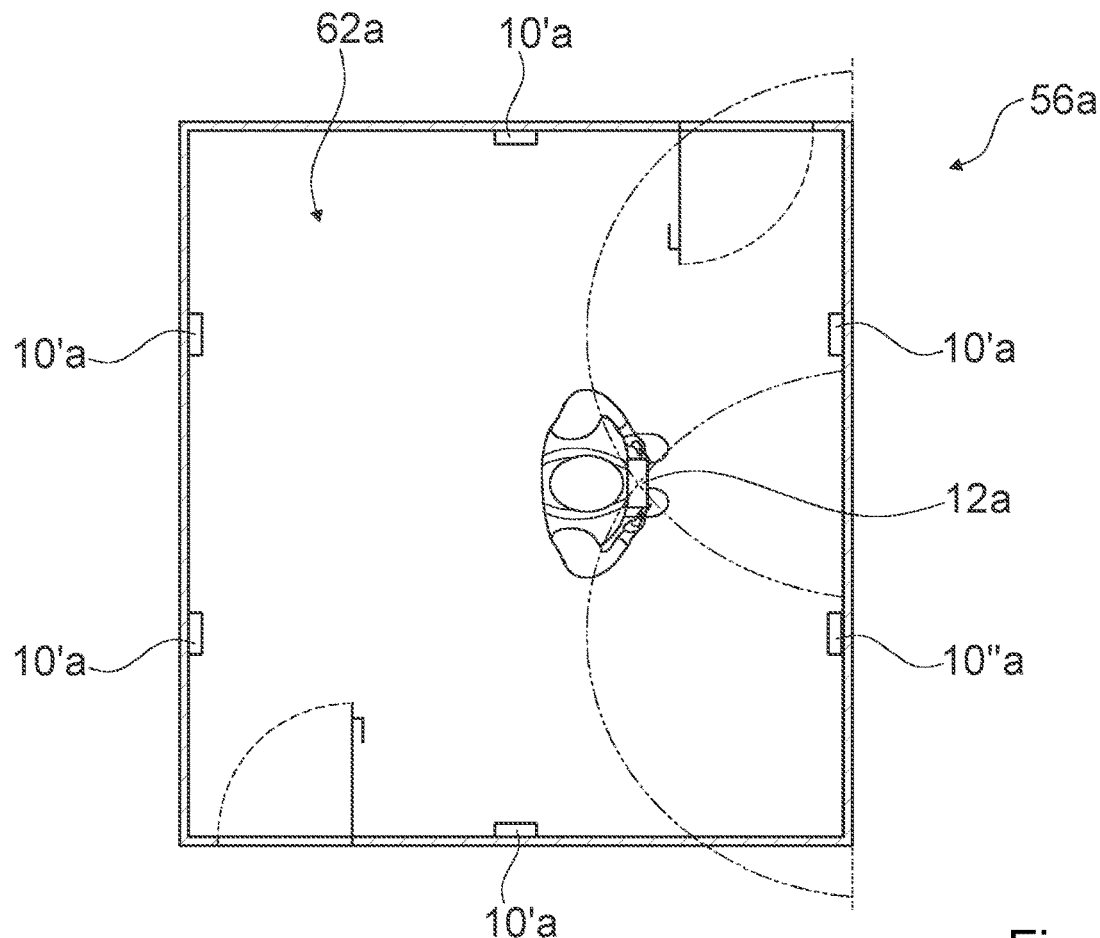
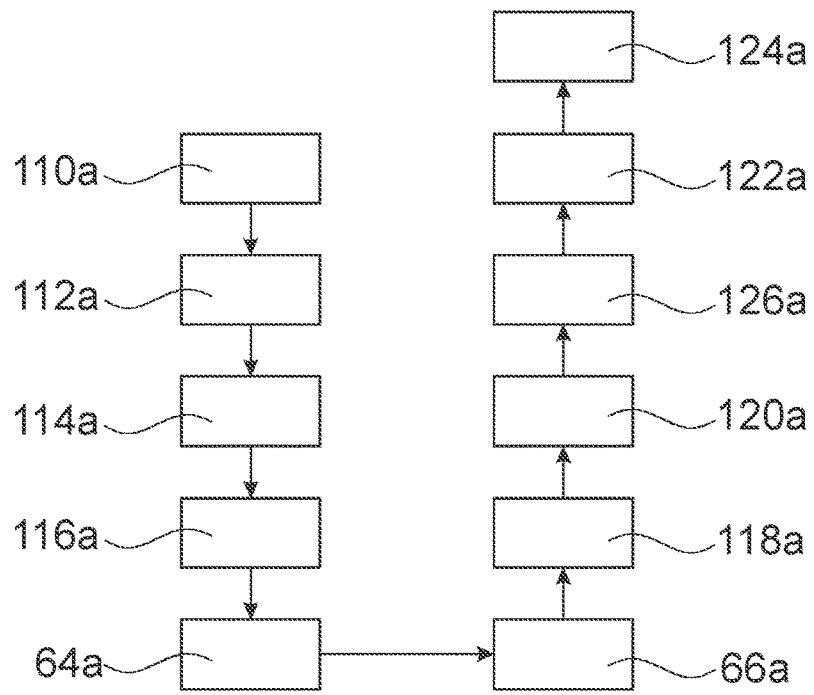
Fig. 5
Fig. 6

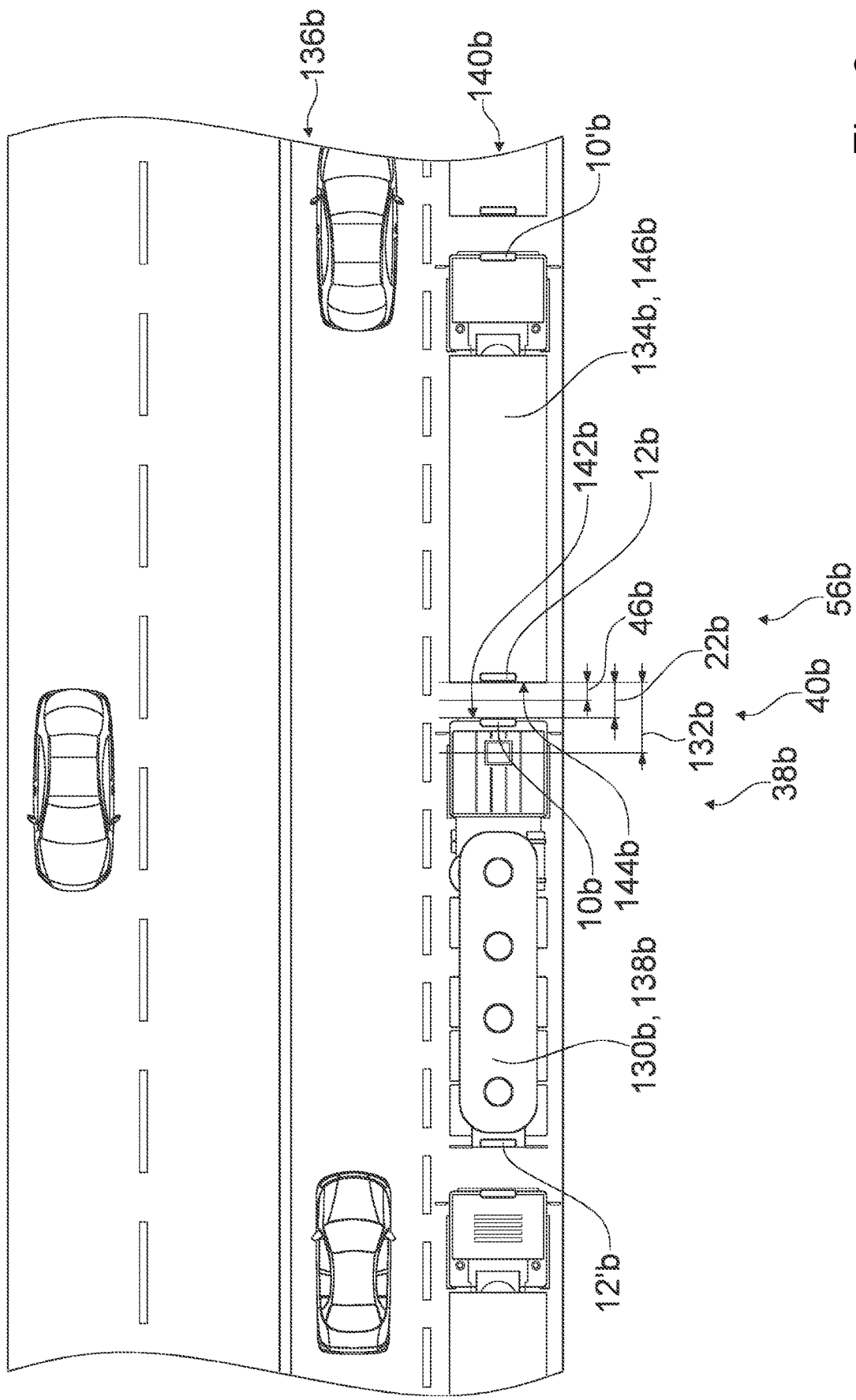

DISTANCE-DETERMINING SYSTEM, CONTACT-MONITORING SYSTEM, CONTACT-TRACKING SYSTEM AND METHOD FOR DETERMINING DISTANCE AND/OR TRACKING CONTACT

CROSS-REFERENCE TO RELATED APPLICATIONS

This patent application is a U.S. national stage application of international patent application PCT/EP2021/087318, filed on Dec. 22, 2021, which is based on and claims priority to German patent application DE 10 2020 134 920.3, filed on Dec. 23, 2020, and German patent application DE 10 2021 112 613.4, filed on May 14, 2021, the contents of each being incorporated by reference.

PRIOR ART

The invention concerns a distance-determining system, a monitoring unit, a contact-monitoring system, a contact-tracking system and a method.

In particular in the context of the SARS-CoV-2 pandemic of the years 2020 and 2021, various systems for distance monitoring—like for example the Corona-Warn-App of the German Robert Koch Institute—were developed. However, this system is based on using an active Bluetooth connection, which on the one hand involves comparably high energy consumption, and in many cases allows only inaccurate and/or unreliable distance determination. Moreover, the devices necessary for this (smartphones) are quite expensive.

The objective of the invention is in particular to provide a generic device having advantageous properties with regard to distance determination, preferably in a combination with lowest possible costs and/or in a combination with lowest possible energy consumption. The objective is achieved according to the invention.

Advantages of the Invention

A distance-determining system, in particular a distance-monitoring system, preferably a unidirectional distance-monitoring system, is proposed, with at least one first monitoring unit and with at least one second monitoring unit, wherein at least the first monitoring unit, preferably each monitoring unit of the distance-determining system, comprises a transmitter unit that is configured to emit a sound signal, in particular an ultrasound signal, and an electromagnetic signal, in particular an electromagnetic high-frequency signal, wherein at least the second monitoring unit, preferably each monitoring unit of the distance-determining system, comprises a receiver unit that is configured to receive the sound signal and the electromagnetic signal, such that a distance between the first monitoring unit and the second monitoring unit can be determined on the basis of the runtime difference between the sound signal received by the receiver unit and the electromagnetic signal received by the receiver unit and allocated to the received sound signal. This advantageously enables a particularly reliable and/or accurate distance determination, in particular between two monitoring units of the distance-monitoring system. Advantageously, moreover a measuring of the runtime difference is especially simple due to the utilization of signals having essentially different signal velocities (sound signal: sound velocity in air, i. e. approximately 343 m/s; electromagnetic signal: light velocity, i. e. almost instantaneous with approximately $3*10^8$ m/s). Advantageously, in this way the measuring of the runtime difference is—in particular electronically—particularly easily realizable, in particular if compared to a measuring of a runtime difference of two signals spreading at light velocity or of reflected light-velocity signals. This advantageously allows keeping production costs, and thus costs for individual devices, at a low level.

Advantageously, in the proposed distance-determining system no handshaking is required between individual devices, i. e. between the monitoring units. Advantageously the distance determination is unidirectional. Advantageously, in particular when using ultrasound signals, whose range is limited to a few meters, the distance determination is for system-inherent reasons limited to sources which are arranged in a proximity of few meters relative to one another. This advantageously allows at least substantially excluding or at least considerably reducing sources of errors or disturbances or the like. It is in this way further possible to reduce, if applicable, a maximal number of registered sources, thus advantageously allowing to reduce data processing efforts and/or memory space requirements of the individual devices or of an external evaluation system.

In particular, a "unidirectional distance-monitoring system" is to mean a distance-monitoring system based on exclusively unidirectional communication between individual devices of the distance-monitoring system, in particular between the monitoring units, said communication being in particular realized free of a return channel. In particular, each monitoring unit implements an individual device of the distance-determining system, which is preferably functional completely on its own and in particular does not resort to resources of a host device, like for example a smartphone or the like, or to resources of a central controlling appliance, like for example a hub or the like. Preferably the monitoring units are realized differently than a smartphone. However, it is alternatively also conceivable that the monitoring units are integrated in a suitably modified smartphone. Preferably each monitoring unit comprises at least one (integrated) transmitter unit and at least one (integrated) receiver unit. However, it is alternatively also conceivable that at least one monitoring unit of the distance-determining system comprises only a receiver unit and no transmitter unit or only a transmitter unit and no receiver unit. Beyond this it is also conceivable that a monitoring unit is formed of two separately implemented individual devices, wherein for example a first individual device comprises the transmitter unit and a second individual device, which can be combined with the first individual device or is in a communicative connection with the first individual device, comprises the receiver unit. Preferably the distance-determining system comprises more than two monitoring units. It is in particular conceivable that the monitoring units are realized at least substantially identically to one another.

In particular, the transmitter unit comprises at least one sound transmitter module, preferably an ultrasound transmitter module, which is configured to generate and emit the sound signal, in particular the ultrasound signal. The sound signal is in particular realized as an ultrasound signal. In particular, the ultrasound signal has one or several sound frequencies outside, preferably above, preferentially closely above (near ultrasound) the human auditory sensation area. Preferentially the ultrasound signal has one or several sound frequencies of more than 15 kHz. Preferentially the ultrasound signal has one or several sound frequencies below 1 GHz. Especially preferentially the sound signal comprises sound frequencies in the range of approximately 40 kHz.

Alternatively, it is however also conceivable that, in particular for certain applications, the sound signal has one or several sound frequencies outside the ultrasound range, for example one or several sound frequencies within the human auditory sensation area, one or several sound frequencies in the infrasound range or one or several sound frequencies in the hypersound range. For further information on the acoustics terms used, the standard DIN 1320:1997-06 ("acoustics—terms") may be referred to at this point.

In particular, the receiver unit comprises at least one sound receiver module, preferably an ultrasound receiver module, which is configured for receiving and for characterizing/analyzing the sound signal, in particular the ultrasound signal. Preferably the sound receiver module is configured to determine an exact reception time at which the sound signal is received.

In particular, the transmitter unit comprises at least one EM (electromagnetic waves) transmitter module, preferably an HF (high-frequency) transmitter module, which is configured to generate and emit the electromagnetic signal, in particular the electromagnetic high-frequency signal. In particular, the electromagnetic signal is realized as an electromagnetic high-frequency signal. In particular, the electromagnetic high-frequency signal has one or several frequencies within the frequency band referred to by the term "high-frequency". For example, the high-frequency signal may comprise one or several frequencies within the decameter wave band, very-high-frequency wave band, ultra-high-frequency wave band, centimeter wave band and/or millimeter wave band. Preferentially the electromagnetic high-frequency signal comprises one or several frequencies above 9 kHz. Preferentially the electromagnetic high-frequency signal comprises one or several frequencies below 0.3 THz. Preferentially the electromagnetic high-frequency signal comprises one or several frequencies in ISM (Industrial, Scientific and Medical) bands with general assignment. Advantageously in such a case an effort required for a license is small. Usual frequency ranges of the ISM bands are in such a case in particular 434 MHz, 869 MHz and 2.4 GHz. However, it is alternatively also conceivable that, in particular for certain applications, the electromagnetic signal comprises one or several frequencies outside the frequency band referred to by the term "high frequency", for example one or several frequencies in the kilometer wave band or hectometer wave band, one or several frequencies in the infrared light band or one or several frequencies in the range of visible light or beyond. In particular, the receiver unit comprises at least one EM receiver module, preferably an HF receiver module, which is configured to receive and characterize/analyze the electromagnetic signal, in particular the electromagnetic high-frequency signal. Preferably the EM receiver module is configured to determine an exact receiving time at which the electromagnetic signal is received. In particular, the receiver unit is only configured to receive and/or analyze signals from other monitoring units. In particular, the receiver unit is not configured to receive and/or analyze a reflected signal by the transmitter unit of the same monitoring unit.

In particular, a sound signal or a bundle (packet) of ultrasound signals, together with an electromagnetic signal or a bundle (packet) of electromagnetic signals in each case form a signal pair belonging together. Preferably the runtime difference between the signals or signal bundles (signal packets) of the belonging-together signal pairs is determined. In particular, for a determination of the distance between the monitoring units, the runtime difference is multiplicated with the signal velocity of the sound signal.

Where appropriate, a temporal relation between the electromagnetic signal and the sound signal within a signal pair must be considered when calculating the runtime difference. Preferably the sound signal and the electromagnetic signal of a signal pair are emitted by the respective transmitter unit at least substantially simultaneously. However, alternatively it is also conceivable that a temporal offset exists or is predetermined, with a fix temporal relation or with a variable temporal relation between the emitting times of the electromagnetic signal and the sound signal. In this case the temporal offset must be considered, which means must be known, for the distance determination. It is in particular conceivable that the information on the temporal offset is contained in the electromagnetic signal or in the ultrasound signal or is emitted together with the electromagnetic signal or in the ultrasound signal. Preferably, herein the electromagnetic signal of a signal pair is emitted before the sound signal of the signal pair. This advantageously allows further increasing an absolute time difference between reception of the electromagnetic signal and of the sound signal, such that advantageously particularly simple electronics, in particular a particularly simple clock, is sufficient for the receiver module. For example, the transmitter unit emits a signal pair in regular and/or irregular intervals (for example every second or every ten seconds).

"Configured" is in particular to mean specifically programmed, specifically designed and/or specifically equipped. By an object being configured for a certain function is in particular to be understood that the object fulfills and/or executes said certain function in at least one application state and/or operation state.

Furthermore, it is proposed that the sound signal emitted by the transmitter unit and the electromagnetic signal emitted by the transmitter unit in each case comprise an, in particular common, identifier, which is clearly allocatable to the respective transmitter unit. This advantageously enables particularly reliable distance determination. It is in this way advantageously possible to ensure that the received signals originate from the same source. Advantageously, faulty determination due to a mixing of signals from different sources can be prevented. Also, a downstream-connected analysis of determined distances is advantageously enabled. Preferably the identifier is integrated (for example by a frequency modulation, phase modulation, pulse modulation and/or amplitude modulation) in the sound signal that is also used for the distance determination and/or in the electromagnetic signal that is also used for the distance determination. However, it is alternatively also conceivable that the identifier is attached in a separate signal to the sound signal and/or to the electromagnetic signal. In particular, each identifier is bijectively assigned to a certain monitoring unit, in particular to a certain transmitter unit. It is in particular conceivable that a reading-out of the identifier and/or an allocation of the identifier to a monitoring unit is effected already on the monitoring unit receiving the signals with the identifier, or that the reading-out of the identifier and/or the assignment of the identifier is brought about in a downstream (external) analysis of the data received by the monitoring unit in a time interval. In particular, the sound signal and the electromagnetic signal of a signal pair in each case have the same identifier or they have identifiers which differ from one another but find themselves in an unambiguous context (known to the monitoring unit or recognizable by the monitoring unit). In particular, signals originating from different monitoring units will always have different identifiers.

Beyond this it is proposed that at least the second monitoring unit, preferably any monitoring unit of the distance-determining system, comprises a data processing unit, which is at least configured for determining the distance between the first monitoring unit and the second monitoring unit on the basis of the runtime difference of the sound signals and electromagnetic signals received by the receiver unit and emitted by the first monitoring unit. This advantageously enables timely distance determination, preferably (almost) real-time distance determination, thus allowing—for example—outputting a direct distance alert. In this way advantageous infection protection properties are attainable, in particular in a utilization in the context of fighting an epidemic, a pandemic, or the like. A "data processing unit" is in particular to mean a unit with a processor unit, preferably a processor, and with a memory unit, preferably a memory module (ROM, RAM and/or a non-volatile memory module) and with an operation program stored in the memory unit.

If the determinable distance, preferably the determined distance, between the first monitoring unit and the second monitoring unit has an accuracy of at least 5 cm, preferably of at least 2.5 cm, advantageously particularly useful and/or accurate distance determination, in particular between two monitoring units of the distance-monitoring system, is enabled. In this way advantageous infection protection properties are achievable, in particular in a utilization in the context of fighting an epidemic, a pandemic, or the like.

It is moreover proposed that the receiver unit comprises the sound receiver module, in particular the ultrasound receiver module, for receiving the sound signals, in particular the ultrasound signals, preferably of a further monitoring unit, the sound receiver module being configured to carry out an at least rough directional determination of the received signals. This advantageously enables a particularly accurate and/or particularly useful distance determination, which has at least roughly high resolution in terms of direction. As a result, it is in particular advantageously possible, in particular in a utilization in the context of fighting an epidemic, a pandemic or the like, to more precisely assess an infection risk due to a determined contact, in particular as direct "face-to-face" contacts involve an especially high infection risk in the case of airborne disease-transfer paths. A "rough directional determination" is in particular to mean an allocation of a source direction into one of two 180°-subregions which are situated in a plane and do not overlap, into one of three 120°-subregions which are situated in a plane and do not overlap, into two of four 90°-subregions which are situated in a plane and do not overlap, into three of six 60°-subregions which are situated in a plane and do not overlap, and/or into four of eight 45°-subregions which are situated in a plane and do not overlap. Preferably the rough directional determination is at least capable of perceiving if a signal is coming directly from the front or from an, in the view direction of a carrier of the monitoring unit, righthand side or lefthand side. In particular, the rough directional determination is at least capable of doing an assignment of the source direction into one of three, preferably into one of four, advantageously into one of five, preferentially into one of six and particularly preferentially into one of eight or more non-overlapping subregions of a total field of sight of the receiver unit. Preferentially the rough directional determination has a direction perception accuracy within the field of sight of the monitoring unit that is at least 60°, preferably at least 45°, preferentially at least 20° and especially preferentially at least 10°.

In this context it is further proposed that at least for carrying out the at least rough directional determination, the sound receiver module, in particular the ultrasound receiver module, comprises two or more sound receiver elements, in particular ultrasound receiver elements. In this way particularly accurate and/or particularly useful distance determination is advantageously enabled, which has at least roughly high resolution in terms of direction. In particular, the two or more sound receiver elements are configured to detect the same sound signal of a further monitoring unit. Preferably it is herein possible to determine a source direction of the received signal on the basis of a runtime difference, of an amplitude difference and/or of a phase difference of the signal received consecutively by the two or more sound receiver elements. Preferably the sound receiver module comprises at least three, in particular linearly independent, sound receiver elements, in particular ultrasound receiver elements. This advantageously allows, in addition to the directional determination, a trilateration of a signal source, in particular at least an at least substantially rough trilateration of a signal source. In particular, the possibility of a directional determination and/or of a trilateration is independent of whether the sound receiver elements are listening in different main beam directions or in main beam directions which are oriented differently from one another. In particular, the sound transmitter module comprises precisely one sound transmitter element. Alternatively, however, more than one sound transmitter element per sound transmitter module is conceivable. Additionally, the utilization of several sound receiver elements, which are in particular oriented in different directions, advantageously allows augmenting an entire receiving range.

If furthermore the sound receiver elements are arranged in the monitoring unit in such a way that they listen in directions that are different from one another, preferably in different geometrical main beam directions, this advantageously enables an even more accurate directional determination. Moreover, advantageously a field of sight of the sound receiver module can be augmented. In particular, the sound receiver unit has a field of sight of at least 90°, preferably of at least 120°, advantageously of at least 140°, preferentially of at least 160° and particularly preferentially of at least 180°. The field of sight is in particular smaller than 360°, preferably smaller than 270°, preferentially smaller than 210° and particularly preferentially at most 180°. This in particular allows improving infection risk contact monitoring, in particular as the direct "face-to-face" contacts involve an especially high infection risk in the case of airborne disease transfer paths.

Alternatively, however, fields of sight of 360° or almost 360° are also conceivable. This in particular allows advantageous room monitoring. In particular, fields of sight of individual sound receiver elements may overlap. In particular, if there are several sound transmitter elements, the sound transmitter elements may emit in main beam directions that are at least substantially parallel to one another or in main beam directions that differ from one another.

In addition, it is proposed that the receiver unit comprises the sound receiver module for a reception of the sound signals and an EM receiver module, which is in particular realized separately from the sound receiver module, for a reception of the electromagnetic signals, the receiver unit having one or several listening operation states and at last one measuring operation state that differs from the listening operation states, wherein in the listening operation states only the sound receiver module or only the EM receiver module is active, and wherein in the measuring operation state the sound receiver module and the EM receiver module are active, or the respective receiver module that is currently inactive is at least temporarily switched on in addition to the respective already active receiver module, or the respective receiver module that is active in the listening operation state is deactivated and the receiver module that is inactive in the respective listening operation state is activated. This advantageously allows attaining particularly reliable and/or accurate distance determination at the same time as a lowest possible energy consumption and/or a utilization of available energy that is as efficient as possible. In particular, the receiver unit consumes substantially less energy in the listening operation state than in the measuring operation state. The respectively other receiver module is in this case in particular in standby mode. For example, on detection of an electromagnetic signal during one of the listening operation states in which only the EM receiver module is active, switching to the measuring operation state is done, thus immediately activating the sound receiver module in order to enable a detection of the sound signal of a signal pair belonging together, which follows the electromagnetic signal. It is also conceivable that in this case, when switching from the listening operation state to the measuring operation state, the EM receiver module is deactivated at least temporarily (e. g. for a given time interval and/or until detection of the corresponding sound signal). In this way additional saving of energy is advantageously achievable.

If moreover in a first listening operation state, of the sound receiver module and the EM receiver module, only that receiver module of the two receiver modules of the receiver unit is active whose energy consumption is lower, it is advantageously possible to even further reduce an energy consumption of the monitoring units, respectively to even further increase a battery lifetime of batteries of the monitoring units. It is further conceivable that if a receiver module of the receiver unit comprises several receiver elements, only part of the receiver elements are active in the listening operation state. All further receiver elements are then in a standby mode. In particular, in the present case the energy consumption of the EM receiver module is lower than the energy consumption of the sound receiver module; which is why the sound receiver module is put into the standby mode in the listening operation state. However, depending on the detectors used, vice-versa proceedings are also conceivable.

If furthermore in a second listening operation state only that receiver module of the receiver modules of the receiver unit is active whose reception range is smaller, especially efficient energy consumption is achievable, in particular in situations in which many monitoring units are operated simultaneously in a confined space. In particular, in this case the measuring operation state is activated only if there is a source within the reception range of the receiver unit having the smaller reception range, i. e. in most cases within the reception range of the sound receiver unit. This advantageously allows preventing an activation of the measuring operation state, increasing energy consumption, occurring already when a source is still so far away from the receiver unit that the sound signal necessary for the distance determination is not yet detectable. Preferably, a switching between the first listening operation state and the second listening operation state is brought about, depending on a given situation, dynamically, in particular by a control and/or regulation unit of the monitoring unit. For example, if a certain frequency of detecting electromagnetic signals is exceeded, the second listening operation state is activated from then on. For example, if a certain frequency of detecting electromagnetic signals is gone below, the first listening operation state is activated from then on. By a "control and/or regulation unit" is in particular a unit to be understood which comprises at least one control electronics units. By a "control electronics unit" is in particular a unit to be understood which comprises a processor unit, preferably a processor, and a memory unit, preferably a memory module, and comprises an operation program stored in the memory unit. In particular, the data processing unit and the control and/or regulation unit may be realized at least partly integrally with each other or even as a common computing system. By two units being realized "partly integrally" is in particular to be understood that the units comprise at least one, in particular at least two, advantageously at least three common elements which are part, in particular a functionally relevant part, of both units. It is in particular conceivable that in a monitoring unit only the first listening operation state or only the second listening operation state is realized.

Alternatively or additionally, it is conceivable that in a third listening operation state only the EM receiver module of the receiver unit is active, and a rough determination for detecting a presence of a further monitoring unit within a reception range of the EM receiver module is carried out by means of the EM receiver module. In particular, the measuring operation state is in such a case only activated if the electromagnetic signal received by the EM receiver module, in particular a signal intensity of the received electromagnetic signal, indicates the further monitoring unit being located in a proximity of the monitoring unit, and thus within the reception range of the sound receiver module of the receiver unit. This advantageously allows optimizing energy consumption. Advantageously, it is moreover possible to obtain different accuracies of the distance determination in different distance ranges. In particular, in a far region of the monitoring unit a rough distance determination is carried out solely on the basis of the electromagnetic signal while an exact distance determination is made in a proximity of the monitoring unit on the basis of the combination of electromagnetic signal and sound signal. The far region in this case in particular comprises a region of all points within a reception range of the EM receiver module which have a distance from the monitoring unit of at least several meters, preferably at least m, preferentially at least 10 m and particularly preferentially 20 m. The proximity in this case in particular comprises a region of all points within the reception range of the EM receiver module which have a distance from the monitoring unit that is at most several meters, preferably at most 3 m, preferentially at most 2 m and particularly preferentially at most 1 m. The third listening operation state may, for example, be also used for building a vehicle convoy of vehicles equipped with the monitoring units. Herein a convoy interconnection is built with the electromagnetic signal over large distances (outside the range of the sound signal, in particular in the far region) with a rough accuracy of (distance) measuring, and in a second step, in particular if the vehicles get sufficiently close to one another, i. e. in particular if they are within the range of the sound signals (proximity), precise guidance of the convoy participants is enabled by switching on the sound signal.

Beyond this it is proposed that at least the second monitoring unit, preferably each monitoring unit of the distance-determining system, comprises a control and/or regulation unit which is configured, upon detection of a signal by the receiver module that is respectively active in the currently set listening operation state, to switch the receiver unit from the listening operation state into the measuring operation state. This advantageously allows obtaining an automated energy-saving function. Advantageously, particularly high energy efficiency is achievable. Vice versa switching from the measuring operation state back into one of the listening-operation states is preferably brought about if for a predetermined or predeterminable point in time no signal is detected any longer, or if the detected signals, in particular the signal intensities of the detected signals, go below a predetermined or predeterminable threshold value.

If moreover the control and/or regulation unit is configured, in a listening operation state in which only the EM receiver module is active, to switch the receiver unit from the listening operation state into the measuring operation state depending on a limit signal intensity of the received electromagnetic signal, in particular if a predetermined or predeterminable limit signal intensity of the received electromagnetic signal is exceeded, it is advantageously possible for the automated energy-saving function to be further improved. In particular, such proceeding is equivalent to a rough initial distance determination by the electromagnetic signal. If, however, for example the sound receiver module is active in the listening operation state, a switching into the measuring operation state is effected upon any detection of a sound signal.

If alternatively or additionally the transmitter unit is configured to emit together with the electromagnetic signal at least one additional information, differing from an identifier, about the related monitoring unit and/or about an external unit which the respective monitoring unit is assigned to, advantageously a plurality of additional interaction options between monitoring units is enabled. For example, the external unit (e. g. a vehicle) which the receiving monitoring unit is assigned to may use the additional information, for example, for a controlling of the external unit or of the interaction between the two external units communicating via the monitoring unit. The external unit could, for example, be a vehicle, like a truck, an agricultural vehicle or an emergency vehicle (police, fire fighters, military, etc.). It is in particular conceivable that more than one additional information is additionally transmitted by the respective monitoring unit. The additional information may, for example, be contained/encoded in the electromagnetic signals emitted by the monitoring units for a distance determination, or may be transmitted via a separate further electromagnetic signal.

Furthermore, if the additional information comprises at least one movement parameter of the related monitoring unit and/or of the external unit which the respective monitoring unit is assigned to, advantageously an adaption of movements of neighboring external units communicating via the monitoring units is achievable. It is in this way advantageously possible, for example, to control a drive of several vehicles in a closed association (convoy drive/convoy drive). In particular, this allows keeping distances between the vehicles within the closed association short, such that advantageously energy can be saved and/or efficiency can be increased due to a reduction of a total air resistance of the individual vehicles of the association. It is for example conceivable that trucks equipped with the monitoring units arrange themselves to form associations on motorways or the like, which enables them to drive one behind the other one at short distance (in autonomously controlled fashion). In particular, the movement parameter is realized as a speed, for example a driven speed of the external system which the monitoring unit is assigned to, as an acceleration, e. g. an initiated braking or speed increase of the external system which the monitoring unit is allocated to, as a change in direction, for example an initiated steering movement of the external system which the monitoring unit is assigned to, or the like. For example, on a front side and on a rear side of a truck respectively one monitoring unit is mounted, wherein the respectively front monitoring unit actively identifies a further truck driving in front thereof, in particular actively identifies the further monitoring unit mounted on the rear side of the truck driving in front, and receives the distance as well as the movement parameters of the truck driving in front via the signals emitted by the further monitoring unit, such that the truck is advantageously controllable on the basis of the received data. Advantageously, this allows safely realizing convoy drives with distances between individual vehicles of the convoy of few meters, preferentially less than 1 meter and preferably less than 0.5 m. It is in particular conceivable that in a context of controlling the drives of vehicles in a closed association, the distance-determining system forms a primary system that controls the convoy drive, or forms a secondary system complementarily supporting a further primary system, which is based on a different technology and controls the convoy drive. If the distance-determining system is used as a secondary system, it is advantageously possible to create a second technological pathway based on a technology that differs from the primary system (e. g. a directly coupled radio contact between two vehicles), which advantageously allows reducing failure probability or misfunctioning of a total system monitoring the convoy drive.

Moreover, the monitoring unit for the distance-determining system, comprising the transmitter unit and the receiver unit, is proposed. This advantageously enables reliable and accurate distance determination.

Beyond this a contact-monitoring system with the distance-determining system is proposed, at least for a monitoring of an observation of given distances, preferably of minimal distances, for example so as to avoid infection and/or to avoid contact to dangerous materials, e. g. a radiation source etc., and/or to avoid contact to a machine, e. g. a handling robot/industrial robot etc.; and/or of maximal distances, for example so as to maintain an optimal convoy distance in road traffic and/or for monitoring children, objects, etc. Advantageously, in particular if ultrasound signals are used, contacts are registered by the contact-monitoring system only in the case of direct or almost direct line-of-sight connections (the ultrasound signals do not penetrate a body and are thus only emitted in a sight direction), which advantageously allows concentrating a contact monitoring on contacts involving particularly high risk. This advantageously enables especially selective and efficient contact monitoring, which is in particular capable of sorting out and dismissing contacts involving a low risk (which is for example not possible in the Bluetooth monitoring of the Corona-Warn-App). Advantageously, in particular if ultrasound signals are used, contacts in which the persons standing opposite each other or the dangerous goods are separated by a wall or a pane (e. g. by a plexiglass wall) are not erroneously registered as risk contacts by the contact-monitoring system, in particular as the ultrasound signals cannot penetrate the wall or pane. It is however possible, e. g. in the exemplary case with the plexiglass wall, that a "protected" contact is registered by the detection of the nearly unattenuated electromagnetic signal with an absent sound signal. In particular, possible fields of application of the contact-monitoring system comprise at least the following target groups: a) visitors, employees and/or residents of retirement homes and/or nursing homes, in which infections will have maximum effect; b) clients and/or staff of supermarkets and/or shops; c) children and/or teachers/childcare workers in schools and/or daycare centers; d) visitors and/or activists in the context of cultural and/or sports events; e) workers in production; f) employees and/or clients/visitors of public institutions and/or public offices; g) workers in hazard areas. Thus, in a convoy drive each vehicle knows the identities, the distances and/or the movement parameters of the first further vehicle driving directly in front of the vehicle and/or of the second further vehicle driving directly behind the vehicle.

It is also proposed that at least the second monitoring unit, preferably each monitoring unit of the distance-determining system, comprises an alerting device or is connected to an external alerting device in terms of data-transmission technology, the alerting device being configured to output an alert signal if a predeterminable minimal distance from the first monitoring unit is gone below and/or if a predeterminable maximal distance from the first monitoring unit is exceeded. This advantageously enables effective, simple and/or direct contact monitoring. Advantageously, it is in this way possible to directly perceive and to separate a contact. Advantageously, real-time contact monitoring is enabled, thus considerably reducing a number of risk contacts. The alerting unit is in particular integrated in the monitoring unit or is at least connected to the monitoring unit in terms of data-transmission technology. For example, outputting the alert signal to a cellphone or smartphone is conceivable, which will then do the alerting by means of a warning sound, a vibration, a light signal or a notification. On the basis of the alerting, a vehicle may for example initiate an automated controlling measure so as to return into a predetermined distance range between the minimal distance and the maximal distance. Alternatively or additionally, it is conceivable that the alerting device is configured to output an alert signal if a predeterminable minimal distance from the first monitoring unit is exceeded and/or if a predeterminable maximal distance from the first monitoring unit is gone below.

If the alerting device comprises an optical signal generator (e. g. an LED), an acoustical signal generator (e. g. a loudspeaker, a buzzer or a siren) and/or a mechanical signal generator, like for example a vibration signal generator, particularly effective and/or particularly perceivable alerting is advantageously enabled. It is in particular conceivable that a signal intensity outputted by the alerting device, for example a luminous intensity, a sound volume and/or a vibration intensity, increases or decreases depending on the distance determined by the contact-monitoring system.

It is further proposed that at least the second monitoring unit comprises a control and/or regulation unit, which is configured to output a control signal to a further external unit that is assigned to the second monitoring unit on the basis of the measured minimal distance, on the basis of the measured maximal distance and/or on the basis of a further information about the first monitoring unit and/or about an external unit which the first monitoring unit is assigned to, said information having been received together with the electromagnetic signal and differing from an identifier. This advantageously allows achieving at least semiautomated, preferably fully automated, adaption of movements of neighboring external units which communicate via the monitoring units. For example, it is in this way advantageously possible to control a drive of several vehicles in a closed association. In particular, the monitoring unit is connected to a control unit of the further external unit in terms of data-transmission technology, for example for a transmission of the control signal. Alternatively it is conceivable that the control unit of the further external unit carries out at least part of the data evaluation on its own, which means, for example, that is receives raw data from the monitoring unit. In particular, on detection of the minimal distance between the external unit (the vehicle driving in front) and the further external unit (the vehicle driving behind) being gone below, an at least temporary speed reduction is realized. In particular, on detection of the maximal distance between the external unit (the vehicle driving in front) and the further external unit (the vehicle driving behind) being exceeded, an at least temporary speed increase is realized. In particular, on detection of a change in a movement parameter of the external unit (the vehicle driving in front), suitable controlling of the further external unit (the vehicle driving behind) is initiated, as a result of which the minimal distance and the maximal distance are maintained. For this purpose, for example, an identical change in the movement parameter of the further external unit is generated/initiated.

In addition, it is proposed that the contact-monitoring system comprises a grouping function configured to make an activation of the alerting device dependent on a received identifier, which is contained in a signal pair comprising a sound signal and an electromagnetic signal and which is bijectively assigned to a further monitoring unit grouped in a common group with the second monitoring unit. This advantageously allows carrying out a fine-tuning of an alerting behavior and/or a contact monitoring limited to different groups of persons or the like. In particular, if the grouping function is applied, the alerting device is activated only if a contact is detected with a source comprising an identifier, which is unknown to the respective monitoring unit or an identifier which is not assigned to the common group in the monitoring unit. In particular, if the grouping function is applied, the alerting device is not activated if a contact is detected with a source comprising an identifier which is known to the respective monitoring unit or an identifier which is assigned to the common group in the monitoring unit. In particular, the grouping information for an execution of the grouping function may be stored on the memory module of the data processing unit or of the control and/or regulation unit or on a separate memory module. In particular, the data processing unit or the control and/or regulation unit is configured for carrying out and/or executing the grouping function. It is moreover conceivable that already the execution of the distance determination is made dependent on the grouping. Herein received signals with known identifiers are completely ignored.

Furthermore, it is proposed that the monitoring units in each case comprise a fastening device for fastening the monitoring unit to an external unit, for example to a body part or to an outer side of a piece of clothing or to an outer side of a vehicle. This advantageously enables easy application of the contact-monitoring system for a contact monitoring of persons. In particular, the fastening device comprises eyelets for a fastening of a carrying strap, of a collar or of a carrying harness. In particular, the monitoring unit is configured to be fastened on an outer side of a body or of a clothing. In particular, the monitoring unit is fastened to a person in such a way that at least the sound transmitter unit and the sound receiver unit remain free of a covering by pieces of clothing or body parts.

Alternatively, pin-on devices (pins etc.), hook-and-loop connecting devices, gluing devices or the like are also conceivable. Preferably the monitoring unit is fastened in a person's chest region, in a crotch region, in a stomach region or in a head region (e. g. on a helmet/cap). If the monitoring unit is arranged on an outer side of a vehicle, the monitoring unit may also be integrated in a part, in particular an outer paneling part, of the vehicle, for example in a bumper.

Beyond this it is proposed that the monitoring units in each case additionally comprise an ultra-wideband localization device, in particular for an omnidirectional distance determination and directional determination with respect to further monitoring units. This advantageously permits making a mutual localization of monitoring units substantially more precise. It is in particular advantageously possible to augment a localization beyond the perception of direct face-to-face contacts. Advantageously, in this way protected face-to-face contacts, in which for example a plexiglass pane or the like is arranged between the respective persons (cf. supermarket), may also be identified and assessed in a reliable manner. An "ultra-wideband localization device" is in particular to mean a device emitting and/or receiving electromagnetic waves, in particular wave packets, wherein the emitted and/or received electromagnetic waves, in particular the emitted and/or received wave packets, cover an especially large bandwidth, preferably a bandwidth of more than 500 MHz. In particular, the wave packets emitted and/or received by the ultra-wideband localization device comprise a plurality of electromagnetic waves having different frequencies, which preferably have a fix phase relation with respect to one another. The ultra-wideband localization device is in particular configured for executing a "two-way ranging (TWR)" localization method, a "time difference of arrival (TDoA)" localization method, an "angle-of-arrival (AOA)" localization method, a "received signal strength (RSS)" localization method, a "phase-difference-of-arrival (PDoA)" localization method or a combination of at least two of the aforementioned localization methods.

It is also proposed that the contact-monitoring system comprises at least two mobile monitoring units, which are for example in each case assigned to persons, and which in each case comprise the transmitter unit and the receiver unit. It is in particular conceivable that at least part of the monitoring units of the contact-monitoring system are assigned to mobile "units" other than persons, i. e. for example robots, vehicles or animals.

It is further proposed that the first monitoring unit of the two mobile monitoring units is arranged on a front side of a first vehicle, which belongs to a convoy/a closed vehicle association, and that the second monitoring unit of the two mobile monitoring units is arranged on a rear side of a second vehicle, which also belongs to the convoy/the closed vehicle association and is enqueued directly in front of the first vehicle in the convoy/the closed vehicle association. In this way an at least semiautomated, preferably fully automated, adaption of movements of neighboring external units communicating via the monitoring units is advantageously attainable. For example, this advantageously allows controlling a drive of several vehicles in the closed association. In particular, the convoy/the closed association comprises a plurality of further vehicles in addition to the first vehicle and the second vehicle.

Moreover, a contact-tracking system, at least for a backtracking of contacts, in particular of chains of infection, and/or of convoy drives is proposed, with the distance-determining system or with the contact-monitoring system. This advantageously enables effective and accurate subsequent backtracking of contacts if required, for example after subsequent confirmation of an infection or contamination of a person in a group of persons. Alternatively or additionally, this advantageously allows controlling a drive of several vehicles in the closed association/in the convoy.

It is further proposed that at least the second monitoring unit, preferably each monitoring unit of the distance-determining system, comprises a memory module which is configured to register received signals for later analysis. If required, in this way an effective and accurate subsequent backtracking of contacts is advantageously enabled. In particular, the memory module may be realized as the memory module of the data processing unit or as the memory module of the control and/or regulation unit and/or as a separate memory module of the monitoring unit.

If herein at least the second monitoring unit, preferably each monitoring unit of the distance-determining system, is at least configured to store in the memory module a time of a signal reception, a signal intensity of a signal reception, a distance from a further monitoring unit obtained on the basis of received signals, a duration of a minimal distance or a maximal distance being exceeded/gone below, a number of events of the minimal distance or the maximal distance being exceeded/gone below, and/or an identifier belonging to a further monitoring unit that emits the received signal, this advantageously enables, if required, effective and accurate subsequent backtracking of contacts.

It is also proposed that at least the second monitoring unit, preferably each monitoring unit, comprises a wireless or wire-bound read-out interface for reading out data stored in the memory module. This advantageously enables, if required, effective and accurate subsequent backtracking of contacts, which can in particular be carried out and/or checked externally. The wireless read-out interface may be embodied, for example, as an NFC interface, as a Bluetooth interface or as a WLAN interface. Alternatively or additionally, the read-out interface may be embodied as an inductive data interface, which is in particular configured for transmitting data via an inductive energy transmission signal, for example by a modulation of the energy transmission signal emitted by a charging station or by a modulation of a load received by the monitoring unit, or the like. This advantageously enables cost-efficient and simple data transmission which saves construction space. The wire-bound interface may be embodied, for example, as a USB interface, as a serial interface, as a memory-card interface, etc.

Furthermore, a contact-tracking system is proposed, comprising at least one mobile monitoring unit, for example assigned to a person, with the transmitter unit and with the receiver unit, and comprising at least one stationary further monitoring unit, which is in particular fixedly installed in an environment accessible for persons, for example in a room of a building, with the transmitter unit and with the receiver unit. Alternatively, it is of course also possible that the contact-tracking system comprises only mobile monitoring units. Beyond this, the contact-monitoring system could of course comprise a memory unit as well. In particular in the case of stationary monitoring units, it may be sufficient, for the sake of simplicity, to read out only the mobile monitoring units and/or to store the data only on the mobile monitoring units. For example, the monitoring units are handed out to participating persons at the beginning of an event or of a visit to a venue (e. g. a trade fair, a concert hall, a movie theater, a restaurant, a sports venue, etc.) and are collected when the event has finished or when the person/s leaves/leave the venue. In this example, the memory modules of the monitoring units are read out after or upon return of the monitoring units such that, if required, the contacts, in particular the risk contacts, of the participating persons with other participating persons can be obtained subsequently (externally). Preferably, including a stationary monitoring unit in the contact-tracking system may be used in order to (additionally) carry out an evaluation of the persons who were in a room/at a location within a certain time interval. In particular, including a stationary monitoring unit in the contact-tracking system may be used in order to carry out an evaluation of a movement profile of a person at a location (which means, for example, a back-tracking regarding which rooms the person has stayed in for how long, or back-tracking regarding near which hazard sources in an environment the person has been at what time and how long, etc.)

If the contact-tracking system comprises a plurality of stationary monitoring units allocated to a common space, wherein the monitoring units are arranged in the common space such that each point of the common space is always situated within the ranges of the transmitter units of at least two, preferably at least three, stationary monitoring units, such that a bilateration of a position of the at least one mobile monitoring unit that is moved in the space is enabled (if there are three stationary monitoring units, a trilateration of the position of the at least one mobile monitoring unit that is moved in the space is enabled), this advantageously allows an additional position determination and/or an additional registration of a movement profile of the mobile monitoring unit. In order to enable a position determination by bilateration, the stationary monitoring units are arranged in the monitored space/area such that, at least for a large portion of all possible range circles of the bilateration, there is always at least one of the two circle intersection points outside the space/area that is to be monitored. In particular, in order to carry out the bilateration, the mobile monitoring units must be arranged approximately at a same level as the stationary monitoring units (e. g. at chest level).

Beyond this a method for distance determination, in particular for distance monitoring, preferably for unilateral distance monitoring, by means of the distance-determining system, for a contact monitoring by means of the contact-monitoring system and/or for a contact tracking by means of the contact-tracking system, is proposed. This in particular allows achieving advantageous properties with regard to an accuracy of a distance determination, to system costs and/or to system energy consumption.

If in at least one method step of the method for distance determination the runtime difference is determined between the sound signal, in particular the ultrasound signal, and the electromagnetic signal, in particular the electromagnetic high-frequency signal, which is preferably emitted from almost the same place as the sound signal, and if then in a further method step of the method for distance determination a distance value between an emission place of the two signals and a reception place of the two signals is obtained on the basis of the determined runtime difference, a particularly reliable and/or accurate distance determination, in particular between two monitoring units of the distance-determining system, is advantageously enabled.

Furthermore, it is proposed that distance values and/or contact durations, in particular durations of the minimal distance or the maximal distance being exceeded or gone below, preferably convoy driving durations, which were determined relative to at least one further monitoring unit by means of the distance-determining system, preferably by means of the contact-tracking system, are used—preferably depending on an application area of the distance-determining system, in particular of the contact-tracking system—for a calculation of an infection risk arising therefrom or for a calculation of an (economic) slipstream advantage arising therefrom. In this way an especially advantageous application of the registered data is attainable. On the one hand, reliable infection protection is advantageously obtainable and, on the other hand, a high level of economic efficiency of convoy drives is advantageously achievable. The contact-tracking system is in particular configured to store data pertaining to a position of vehicles within a convoy and/or data pertaining to the identities of convoy participants. In particular, for this purpose the identifiers of all convoy participants are transmitted at least to a leading vehicle of the convoy, preferably to all convoy participants, preferentially by the monitoring units via the electromagnetic signal or via a further signal that is independent from the distance determination. In particular, the economic slipstream advantage is provided for all vehicles driving behind a leading vehicle at appropriate distances, for example by reduced energy costs, like fuel costs, or by reduced wear on the vehicle.

Beyond this it is proposed that by at least one vehicle driving in a convoy, in particular the foremost vehicle of the convoy, a notification, in particular a demand for payment, is created on the basis of the calculation of the (economic) slipstream advantage provided for at least one further vehicle of the convoy that is driving behind the vehicle, and is preferably transmitted to the at least one further vehicle of the convoy. By the proposed method it is exactly known who has been in the convoy at what time, how long and at which distance from other participants; it is hence advantageously possible to accurately calculate the economic advantage/economic disadvantage of the individual participants in the traffic association, and following this to calculate a fair compensation of said advantage/disadvantage (e. g. economic compensation by payments). This advantageously results in creating particularly high willingness to participate in convoys and/or to lead convoys. If vehicles are available which have suitable equipment, the proposed method enables convoys forming on their own accord, and makes this economically attractive. For example, the driver of the leading vehicle carries particularly great responsibility and therefore has a higher workload than the drivers of the following vehicles. Advantageously, on the basis of the proposed method, the driver can be paid for his additional effort by the unburdened drivers of the further vehicles of the convoy. Alternatively, it is also conceivable that the convoy data are transmitted to a central accounting point or are read out subsequently by a central accounting point. In addition, it is conceivable that convoy participants who do not pay at the end will be refused the next time they try joining a convoy (for example by way of cooperative signals being no longer transmitted).

The distance-determining system according to the invention, the monitoring unit according to the invention, the contact-monitoring system according to the invention, the contact-tracking system according to the invention and the method according to the invention shall herein not be limited to the application and implementation described above. In particular, in order to fulfill a functionality that is described here, the distance-determining system according to the invention, the monitoring unit according to the invention, the contact-monitoring system according to the invention, the contact-tracking system according to the invention and the method according to the invention may comprise a number of individual elements, components, method steps and units that differs from a number given here.

DRAWINGS

Further advantages will become apparent from the following description of the drawings. In the drawings two exemplary embodiments of the invention are illustrated. The drawings, the description and the claims contain a plurality of features in combination. Someone skilled in the art will purposefully also consider the features separately and will find further expedient combinations.

Figure 2:
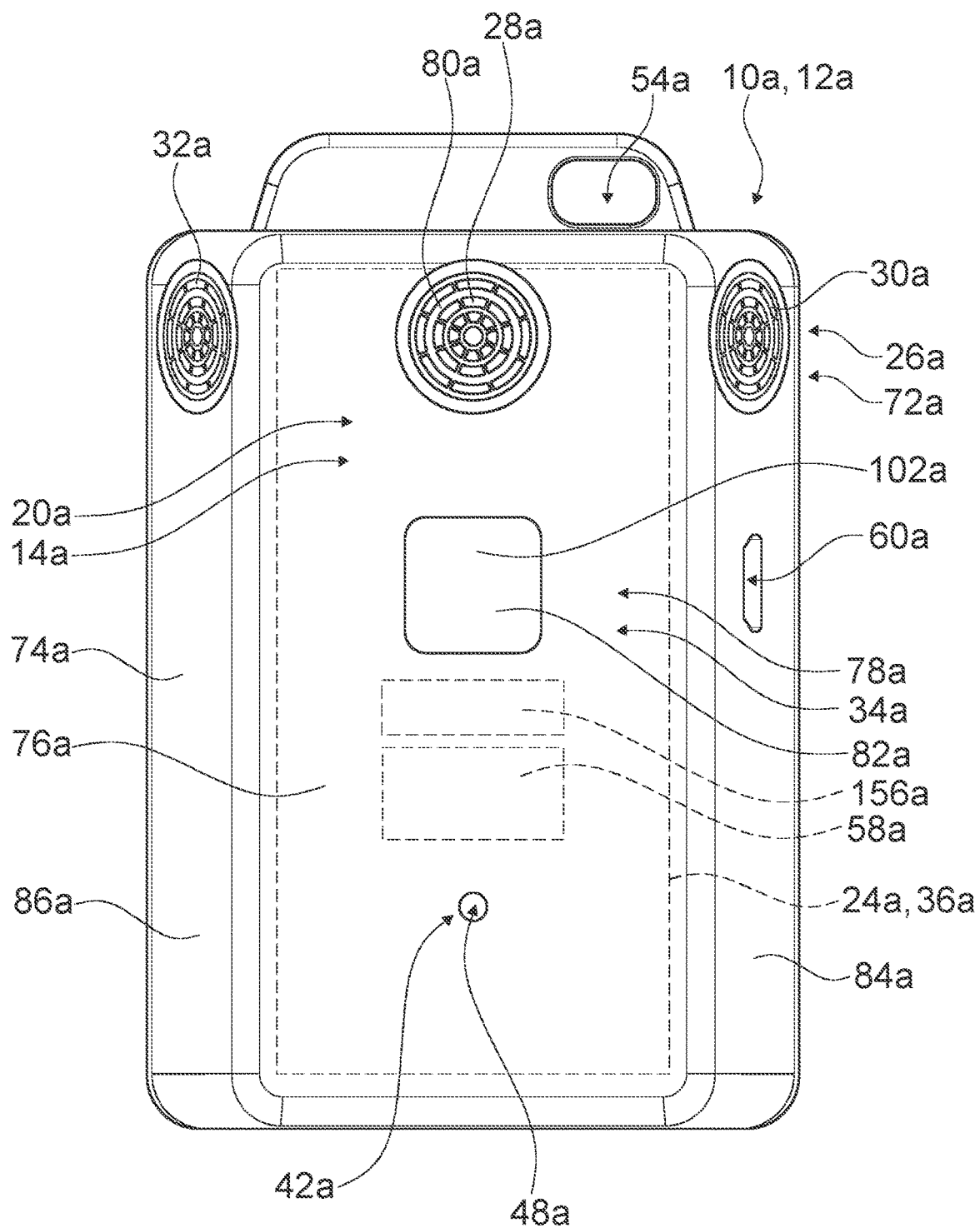
Figure 3:
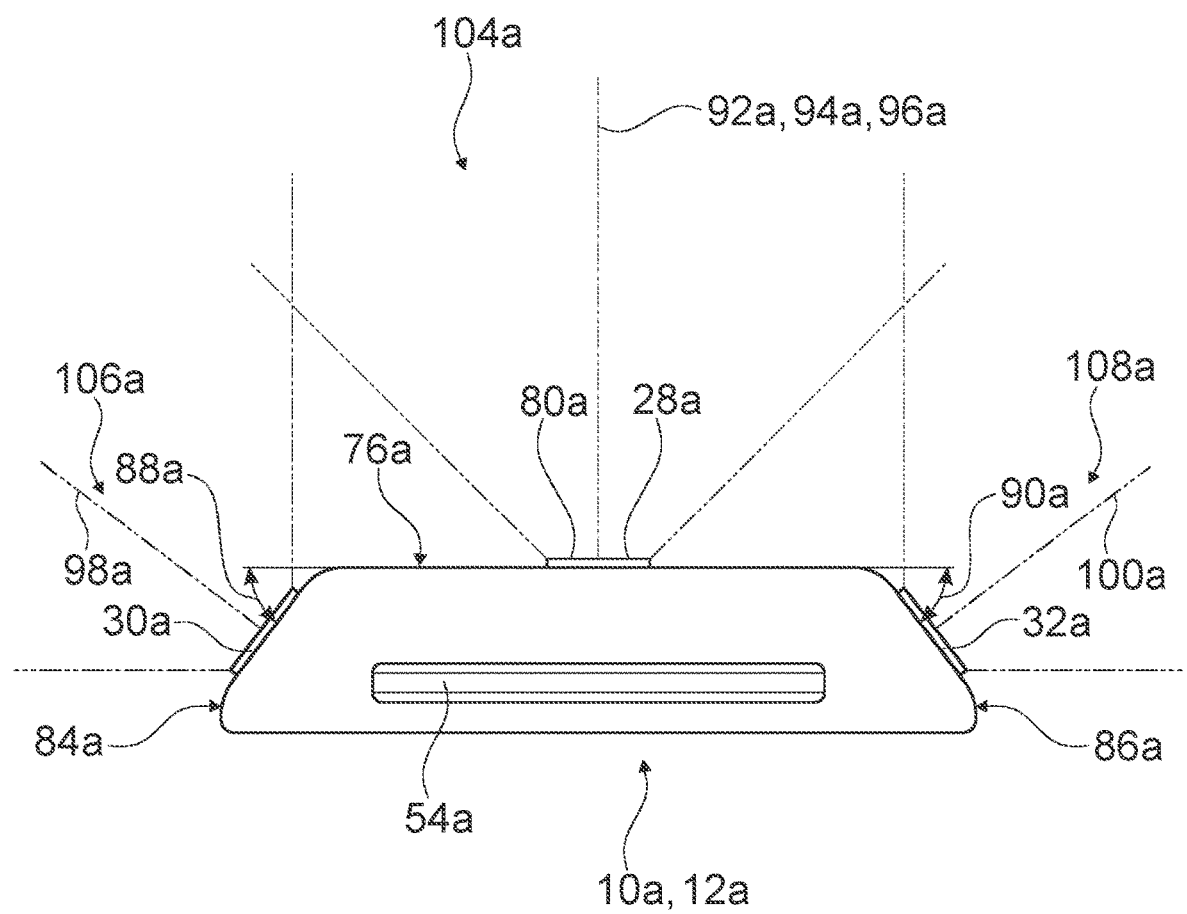
Figure 4:
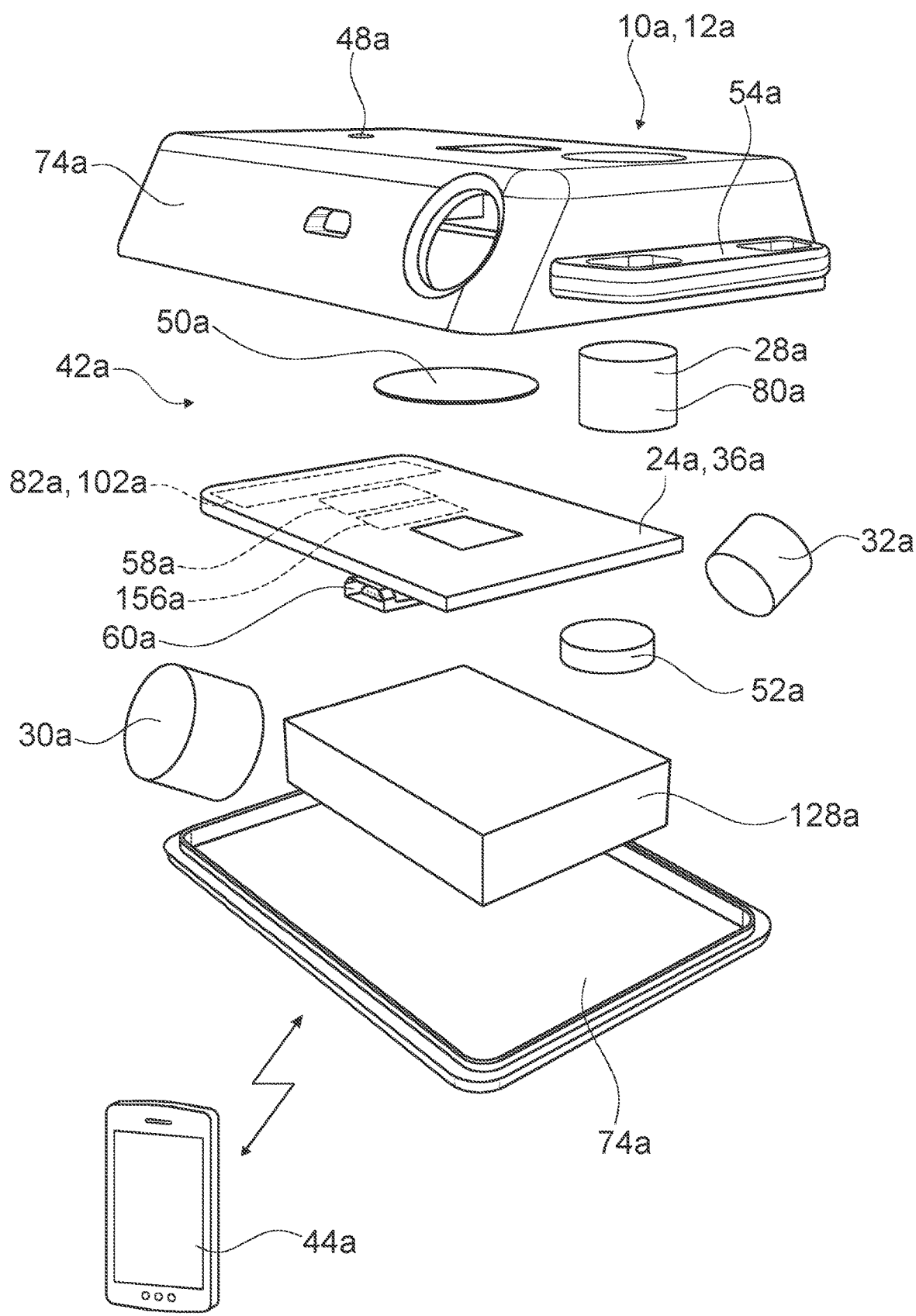
Figure 7A:
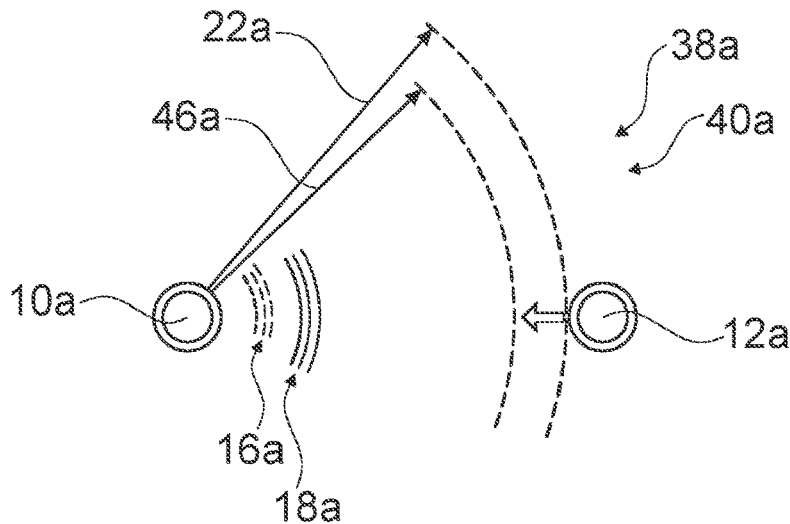
Figure 7B:
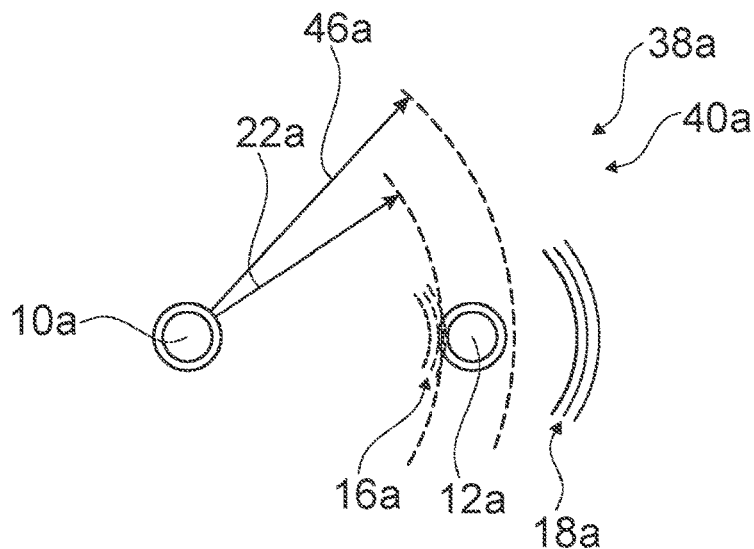
Figure 7C:
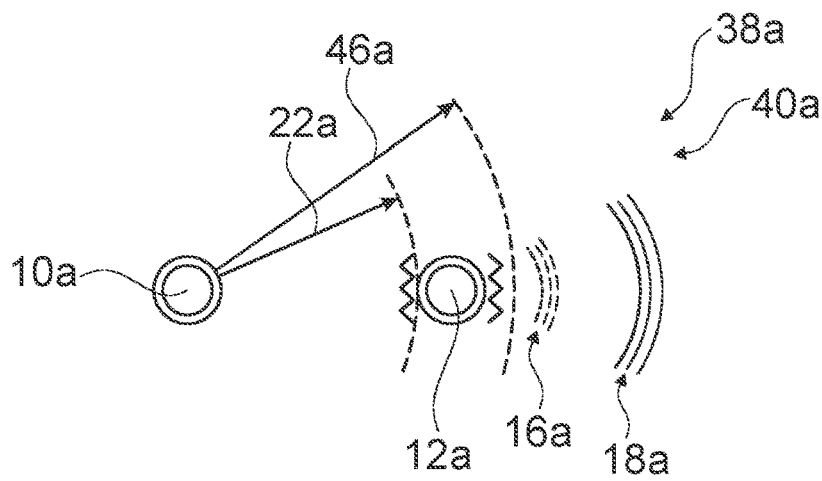
Figure 9:
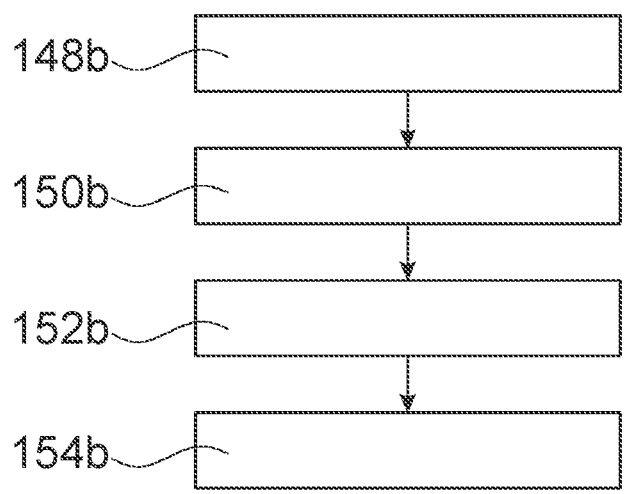

It is shown in:

FIG. 1 a schematic illustration of a contact-monitoring system and of a contact-tracking system, in each case with a distance-determining system, FIG. 2 a schematic front view of a monitoring unit of the distance-determining system, FIG. 3 a schematic view from above onto the monitoring unit, FIG. 4 a schematic exploded view of the monitoring unit, FIG. 5 a schematic illustration of an exemplary implementation of the contact-tracking system, FIG. 6 a schematic flow chart of a method for distance determination by means of the distance-determining system, FIG. 7a-c a schematic exemplary process flow of an alerting process by the contact-monitoring system, FIG. 8 a schematic illustration of an alternative contact-monitoring system and an alternative contact-tracking system, in each case with an alternative distance-determining system, and FIG. 9 a schematic flow chart of a method for contact tracking by means of the contact-tracking system within vehicle convoys.

DESCRIPTION OF THE EXEMPLARY EMBODIMENTS

FIG. 1 shows a schematic illustration of a contact-monitoring system $40a$. The contact-monitoring system $40a$ is configured for monitoring the observation of given minimal distances $46a$ (e. g. 1.5 m or 2 m). In the case shown by way of example, the contact-monitoring system $40a$ is configured for an avoidance of infections. Alternatively, however, the contact-monitoring system $40a$ could as well be configured for other tasks, for example for an avoidance of a contact to hazardous goods or for an avoidance of a contact to dangerous apparatuses/machines. The contact-monitoring system $40a$ illustrated in FIG. 1 at the same time forms a contact-tracking system $56a$. The contact-tracking system $56a$ is configured for a back-tracking of contacts, for example chains of infection. Alternatively, however, the contact-tracking system $56a$ may also be configured for a back-tracking of contacts to hazard sources, for example radioactive radiation sources.

The contact-monitoring system $40a$ and the contact-tracking system $56a$ comprise a distance-determining system $38a$. The distance-determining system $38a$ forms a unidirectional distance-monitoring system. The distance-determining system $38a$ comprises a first monitoring unit $10a$. In the example shown in FIG. 1, the first monitoring unit $10a$ is assigned to a first person. The distance-determining system $38a$ comprises a second monitoring unit $12a$. In the example shown in FIG. 1, the second monitoring unit $12a$ is assigned to a second person. The persons in each case wear the monitoring units $10a$, $12a$ without a covering in front of their chests. The monitoring units $10a$, $12a$ in each case comprise a transmitter unit $14a$ (see FIG. 2). The transmitter unit $14a$ is configured for an emission of a sound signal $16a$. The sound signal $16a$ is realized as an ultrasound signal. The ultrasound signal has a maximal range $70a$. The maximal range is below 10 m. The transmitter unit $14a$ is configured for an emission of an electromagnetic signal $18a$. The electromagnetic signal $18a$ is realized as an electromagnetic high-frequency signal. A maximal range of the electromagnetic high-frequency signal is far above m. The transmitter unit $14a$ is configured to emit a belonging-together signal pair $68a$ consisting of the emitted sound signal $16a$ and the emitted electromagnetic signal $18a$. The sound signal $16a$ emitted by the transmitter unit $14a$ and the electromagnetic signal $18a$ emitted by the transmitter unit $14a$, which together form the belonging-together signal pair $68a$, comprise respectively one common identifier, which is clearly assignable to the respective transmitter unit $14a$ emitting the signal pair $68a$ and/or to the respective monitoring unit $10a$, $12a$ emitting the signal pair $68a$.

The monitoring units $10a$, $12a$ in each case comprise a receiver unit $20a$ (see FIG. 2). The receiver unit $20a$ is configured for a reception of the sound signal $16a$. The receiver unit $20a$ is configured for a reception of the electromagnetic signal $18a$. The receiver unit $20a$ is configured to identify a belonging-together signal pair $68a$ consisting of the received sound signal $16a$ and the received electromagnetic signal $18a$. A distance $22a$ between the first monitoring unit $10a$ and the second monitoring unit $12a$ (i. e. between the first person and the second person) can be determined from a runtime difference between the signals $16a$, $18a$ that form the identified signal pair $68a$. The distance $22a$ between the first monitoring unit $10a$ and the second monitoring unit $12a$ that is determinable by the distance-determining system $38a$ has an accuracy of at least 5 cm.

The contact-monitoring system $40a$ shown exemplarily in FIG. 1 comprises two mobile monitoring units $10a$, $12a$, which are in each case assigned to a person and in each case comprise a transmitter unit $14a$ and a receiver unit $20a$. The contact-monitoring system $40a$ may comprise any number of further monitoring units $10a$, $12a$. The monitoring units $10a$, $12a$ of the contact-monitoring system are realized substantially identically to each other, except for an identifier that is in each case assigned bijectively to only one of the monitoring units $10a$, $12a$.

FIG. 2 shows a schematic front view of one of the monitoring units $10a$, $12a$. The monitoring unit $10a$, $12a$ comprises a data processing unit $24a$. The monitoring unit $10a$, $12a$ comprises a control and/or regulation unit $36a$. In the example illustrated in the figures, the data processing unit $24a$ at the same time implements the control and/or regulation unit $36a$. The data processing unit $24a$ comprises an electronics unit and/or an operation program which is configured to determine from the signals $16a$, $18a$ received by the receiver unit $20a$ the runtime difference of the signals $16a$, $18a$ which belong to a signal pair $68a$. The data processing unit $24a$ is configured to determine the distance $22a$ between the emitting monitoring unit $12a$ and the receiving monitoring unit $10a$, $12a$ on the basis of the runtime difference of the sound signals $16a$ and electromagnetic signals $18a$ received by the receiver unit $20a$ and emitted by another monitoring unit $10a$, $12a$.

The monitoring unit $10a$, $12a$ comprises a memory module $58a$. The memory module $58a$ is configured to store and/or register the received signals $16a$, $18a$ for later analysis, for example for a subsequent determination of distances $22a$. The monitoring unit $10a$, $12a$ is configured to store in the memory module $58a$ a time of a signal reception. The monitoring unit $10a$, $12a$ is configured to store in the memory module $58a$ a signal intensity of a signal reception. The monitoring unit $12a$ is configured to store in the memory module $58a$ a distance $22a$ from a further monitoring unit $10a$, $12a$, which was determined by the data processing unit $24a$, without covering, from received signals $16a$, $18a$. The monitoring unit $10a$, $12a$ is configured to store in the memory module 58a a duration of exceeding/going below the minimal distance 46a. The monitoring unit 10a, 12a is configured to store in the memory module 58a a number of events of exceeding/going below the minimal distance 46a. The monitoring unit 10a, 12a is configured to store in the memory module 58a an identifier belonging to a further monitoring unit 10a, 12a, which emits the received signal 16a, 18a. The monitoring unit 10a, 12a comprises a read-out interface 60a for reading out the data stored in the memory module 58a. The read-out interface 60a is embodied as a wire-bound interface. The read-out interface 60a is embodied as a Universal Serial Bus (USB) interface. Alternatively or additionally, the monitoring unit 10a, 12a may comprise a wireless read-out interface.

The monitoring unit 10a, 12a comprises a housing unit 74a. The monitoring unit 12a comprises the transmitter unit 14a. The transmitter unit 14a comprises a sound transmitter module 72a. The sound transmitter module 72a is arranged at least largely within the housing unit 74a. The sound transmitter module 72a is configured for emitting the sound signal 16a. The sound transmitter module 72a comprises at least one sound transmitter element 80a, which is configured for generating and emitting the sound signal 16a. A main beam direction 92a (see FIG. 3) of the sound transmitter module 72a is oriented so as to point away perpendicularly from the front side 76a of the housing unit 74a. The transmitter unit 14a comprises an EM transmitter module 78a. The EM transmitter module 78a is arranged at least largely within the housing unit 74a. The EM transmitter module 78a is configured for emitting the electromagnetic signal 18a. The EM transmitter module 78a comprises at least one EM transmitter element 82a, which is configured for generating and emitting the electromagnetic signal 18a. A main beam direction 94a of the EM transmitter module 78a is oriented so as to point away perpendicularly from the front side 76a of the housing unit 74a.

The monitoring unit 10a, 12a comprises the receiver unit 20a. The receiver unit comprises a sound receiver module 26a. The sound receiver module 26a is configured for receiving a sound signal 16a, in particular a sound signal 16a emitted from a further monitoring unit 10a, 12a. The sound receiver module 26a is arranged at least largely within the housing unit 74a. In the example illustrated in FIG. 2, the sound receiver module 26a comprises three sound receiver elements 28a, 30a, 32a. The sound receiver elements 28a, 30a, 32a are arranged at least largely within the housing unit 74a. The sound receiver elements 28a, 30a, 32a are realized as mutually independent, in particular linearly independent, sound sensors, in particular ultrasound sensors.

The sound receiver module 26a is configured for an at least rough directional determination of the received sound signals 16a. The sound receiver elements 28a, 30a, 32a are configured to carry out the at least rough directional determination. The sound receiver elements 28a, 30a, 32a are arranged in the monitoring unit 10a, 12a, in particular within the housing unit 74a, in such a way that they listen in directions that are different from one another. A first sound receiver element 28a is arranged on the front side 76a of the monitoring unit 10a, 12a. A main receiving direction 96a (see FIG. 3) of the first sound receiver element 28a is oriented so as to point away perpendicularly from a front side 76a of the housing unit 74a. A second sound receiver element 30a is arranged on a (viewed in a view from above onto the front side 76a) righthand side 84a of the monitoring unit 10a, 12a. The righthand side 84a of the monitoring unit 10a, 12a is arranged at an angle 88a (see FIG. 3) with respect to the front side 76a of the monitoring unit 10a, 12a. The angle 88a is smaller than 90°. The angle 88a is larger than 25°. The angle 88a is approximately 60°. A main receiving direction 98a (see FIG. 3) of the second sound receiver element 30a is oriented so as to point away perpendicularly from the righthand side 84a of the housing unit 74a. The main receiving direction 98a of the second sound receiver element 30a is angled by the angle 88a relative to the main receiving direction 96a of the first sound receiver element 28a. A third sound receiver element 32a is arranged on a (viewed in a view from above onto the front side 76a) lefthand side 86a of the monitoring unit 10a, 12a. The lefthand side 86a of the monitoring unit 10a, 12a is arranged at an angle 90a (see FIG. 3) relative to the front side 76a of the monitoring unit 10a, 12a. The angles 88a, 90a of the righthand side 84a and the lefthand side 86a are equal in size but have different senses of rotation. A main receiving direction 100a (see FIG. 3) of the third sound receiver element 32a is oriented so as to point away perpendicularly from the lefthand side 86a of the housing unit 74a. The main receiving direction 100a of the third sound receiver element 32a is angled by the angle 90a relative to the main receiving direction 96a of the first sound receiver element 28a.

Further implementations, arrangements and/or orientations of the receiver unit 20a and/or the transmitter unit 14a, which differ from the arrangements illustrated in the figures, are conceivable. By using at least three sound receiver elements 28a, 32a a trilateration of a position of the emitting monitoring unit 10a, 12a is enabled. However, principally the sound receiver elements 28a, 30a, 32a may for this purpose be arranged differently, in particular even in a common plane but spaced apart from one another.

The receiver unit 20a comprises an EM receiver module 34a. The EM receiver module 34a is configured for receiving an electromagnetic signal 18a, in particular an electromagnetic signal 18a emitted by a further monitoring unit 10a, 12a. The EM receiver module 34a is arranged at least largely within the housing unit 74a. In the example illustrated in FIG. 2, the EM receiver module 34a comprises one EM receiver element 102a. The EM receiver element 102a is arranged at least largely within the housing unit 74a.

The receiver unit 20a has a first listening operation state. In the first listening operation state only that receiver module 26a, 34a of the receiver modules 26a, 34a of the receiver unit 20a is active whose energy consumption is lower. In the first listening operation state the EM receiver module 34a is active (if its energy consumption is lower than that of the sound receiver module 26a). In the first listening operation state the sound receiver module 26a is inactive and is preferably in a standby mode. The receiver unit 20a has a second listening operation state. In the second listening operation state only that receiver module 26a, 34a of the receiver modules 26a, 34a of the receiver unit 20a is active whose reception range is smaller. In the second listening operation state the sound receiver module 26a is active (if its reception range is smaller than that of the EM receiver module 34a). In the second listening operation state the EM receiver module 34a is inactive and is preferably in a standby mode. Further listening operation states are conceivable.

The receiver unit 20a has a measuring operation state. The measuring operation state differs from the listening operation states. In the measuring operation state the sound receiver module 26a and the EM receiver module 34a are active. The control and/or regulation unit 36a of the monitoring unit 10a, 12a is configured to switch the receiver unit 20a from the respective listening operation state into the measuring operation state upon detection of a signal 16a, 18*a* by the receiver module 26*a*, 34*a* that is respectively active in the currently set listening operation state. Alternatively or additionally, it is conceivable that the control and/or regulation unit 36*a* is configured, in a listening operation state in which only the EM receiver module 34*a* is active, for example in the first listening operation state, to switch the receiver unit 20*a* from the listening operation state to the measuring operation state depending on a determined limit signal intensity of the electromagnetic signals 18*a* received during the first listening operation state. As long as the field intensities of the electromagnetic signals 18*a* received during the first listening operation state are below the limit field intensity, there will be no switching from the listening operation state into the measuring operation state by the control and/or regulation unit 36*a*. However, as soon as the field intensity of at least one electromagnetic signal 18*a* received during the first listening operation state is above the limit field intensity, there will be switching from the listening operation state into the measuring operation state by the control and/or regulation unit 36*a*.

The monitoring unit 10*a*, 12*a* comprises a fastening device 54*a*. The fastening device 54*a* is configured for a fastening of the monitoring unit 10*a*, 12*a* to a body part or to an outer side of a piece of clothing. In the case shown by way of example, the fastening device 54*a* is configured as an eyelet for receiving a ribbon, for example a collar.

The monitoring unit 10*a*, 12*a* comprises an ultra-wideband localization device 156*a*. The ultra-wideband localization device 156*a* comprises an ultra-wideband transmitter and an ultra-wideband receiver. The ultra-wideband localization device 156*a* works in a frequency range between 100 MHz and 6 GHz with a bandwidth of at least 500 MHz, preferably at least 1 GHz, preferentially at least 2 GHz, even more preferentially at least 4 GHz and particularly preferentially of at least GHz, and/or in a frequency range between 6 GHz and 8.5 GHz with a bandwidth of at least 500 MHz, preferably at least 1 GHz, preferentially at last 1.5 GHz, even more preferentially at least 2 GHz and particularly preferentially of at least 2.5 GHz. In this way disturbance, in particular mutual disturbance, by further radio sources, like for example LoRa, 5G or WLAN (in particular 802.11p), is advantageously avoidable. Advantageously, in particular by the large bandwidth of the frequency range between 6 GHz and 8.5 GHz, particularly high spatial resolution is achievable. Furthermore, advantageously no radio transmission licenses are required for these frequency ranges, in particular if a transmission performance is in a range of −41.3 dbm/MHz. The transmission performance of the ultra-wideband sensor is preferably −41.3 dbm/MHz or less. In particular, the frequency band between 100 MHz and 6 GHz and/or the frequency band between 6 GHz and 8.5 GHz are/is configured at least for distance measuring and/or at least for direction measuring. The ultra-wideband localization device 156*a* is in particular configured to carry out contact monitoring/distance determination with respect to further monitoring units 10*a*, 12*a* which are situated outside fields of sight 104*a*, 106*a*, 108*a* and/or outside ranges of the sound receiver elements 28*a*, 32*a*, and/or which have after establishing contact departed from the fields of sight 104*a*, 106*a*, 108*a* and/or from the ranges of the sound receiver elements 28*a*, 30*a*, 32*a*, and/or which are located in a near environment but have not yet been perceived directly by the sound receiver elements 28*a*, 30*a*, 32*a*. This advantageously allows, in addition to the direct ("face-to-face") contacts, to obtain information about contacts with less risk, i. e. for example contacts that are less close or less direct (e. g. a contact to persons who only stood behind a further person).

For example, by means of the ultra-wideband localization device 156*a* it is possible to obtain an exact position information of the further monitoring unit 12*a*, i. e. an exact determination of a situation with respect to a person whom the further monitoring unit 12*a* is assigned to, while determining by means of the distance-determining method that is based on the runtime difference between the sound signal 16*a* and the electromagnetic signal 18*a* if and/or how long there was sight contact, respectively face-to-face contact, with the person whom the further monitoring unit 12*a* is assigned to. The ultra-wideband localization device 156*a* is not able on its own to determine, for example, if there is a barrier, like for example a plexiglass pane (in a supermarket or the like), between two persons standing face-to-face opposite each other. In order to obtain this information, and in particular for a precise determination of an infection risk caused by the face-to-face contact, a combination of the distance determining method using the ultrasound signal 16*a* (the ultrasound signal 16*a* being totally screened by the plexiglass pane) with the localization method using the ultra-wideband signal (a UWB signal being not screened by the plexiglass pane) is particularly advantageous.

FIG. 3 shows a schematic view from above onto one of the monitoring units 10*a*, 12*a*. In FIG. 3 the main beam directions 92*a*, 94*a* of the transmitter elements 82*a*, the main receiving directions 96*a*, 98*a*, 100*a* of the receiver elements 28*a*, 30*a*, 32*a*, 102*a* and exemplary fields of sight 104*a*, 106*a*, 108*a* of the sound receiver elements 28*a*, 30*a*, 32*a* are schematically illustrated.

FIG. 4 shows a schematic exploded illustration of one of the monitoring units 12*a*. The monitoring unit 10*a*, 12*a* illustrated exemplarily in FIG. 4 is configured to be used in the contact-monitoring system 40*a* and to be used in the contact-tracking system 56*a*. The monitoring unit 10*a*, 12*a* comprises an alerting device 42*a*. Alternatively or additionally, the monitoring unit 10*a*, 12*a* may be connected to an external alerting device 44*a*, e. g. a smartphone or a pager, etc. The alerting device 42*a*, 44*a* is configured to output an alert signal if the (predeterminable or predetermined) minimal distance 46*a* from a further monitoring unit 10*a* is gone below. The alerting device 42*a* of the monitoring unit 12*a* comprises an optical signal generator 48*a*. The optical signal generator 48*a* is embodied as a light-emitting diode. The alerting device 42*a* of the monitoring unit 10*a*, 12*a* comprises an acoustical signal generator 50*a*. The acoustical signal generator 50*a* is embodied as a sound converter outputting frequencies that can be heard by a human. The alerting device 42*a* of the monitoring unit 10*a*, 12*a* comprises a mechanical signal generator 52*a*. The mechanical signal generator 52*a* is embodied as a vibration signal generator.

The contact-monitoring system 40*a* has a grouping function. The grouping function is configured to make an activation of the alerting device 42*a*, 44*a* dependent on a received identifier which is contained in the signal pair 68*a* comprising the sound signal 16*a* and the electromagnetic signal 18*a* and which is bijectively assigned to a further monitoring unit 10*a*, 12*a* that is grouped in a common group with the second monitoring unit 12*a*. The monitoring unit 10*a*, 12*a* comprises a battery 128*a*. The battery 128*a* may be realized as an accumulator. The battery 128*a* is configured to supply the monitoring unit 10*a*, 12*a* with electrical energy. The battery 128*a* is configured to supply the receiver unit 20*a*, the transmitter unit 14*a*, the data processing unit 24*a*, the memory module 58*a* and/or the alerting device 42*a* with electrical energy.

FIG. 5 shows an exemplary implementation of the contact-tracking system 56a comprising a mobile monitoring unit 12a that is assigned to a person and a plurality of stationary monitoring units 10'a, 10"a, which are fixedly installed in a space 62a that is accessible for the person. The mobile monitoring unit 12a registers and stores each contact with each fixedly installed monitoring unit 10'a. This allows registering an entry of the person with the mobile monitoring unit 12a into the space 62a. The stationary monitoring units 10'a, 10"a are arranged in the space 62a such that each point of the space 62a is always within the ranges of the transmitter units 14a, in particular the sound transmitter modules 72a, and/or of the receiver units 20a, in particular the sound receiver modules 26a, of at least two of the stationary monitoring units 10'a, 10"a. In this way a bilateration of a position of the mobile monitoring unit 12a moved in the space 62a is enabled. In this way a movement profile of the person with the mobile monitoring unit 12a in the space 62a can be recorded. It is conceivable that the mobile monitoring units 12a, for example, do not comprise a receiver unit 20a and/or a memory module 58a as in this case the distance determination on the mobile side prevails. However, the mobile monitoring unit 12a and the stationary monitoring units 10'a, 10"a may of course also have at least substantially identical functionalities.

FIG. 6 shows a schematic flow chart of a method for a (unilateral) distance determination by means of the distance-determining system 38a. In at least one method step 110a the monitoring units 10a, 12a are activated (for example when handed to visitors of a venue). After the activation signal pairs 68a are emitted by the monitoring units 10a, 12a. In the emission the signal pairs 68a are equipped with the identifier of the respective monitoring unit 10a, 12a. After the activation the monitoring units 10a, 12a may be in the first listening operation state. After the activation at least the receiver module 26a, 34a that is energetically more economical listens for respective signals 16a, 18a. Of course the listening operation state may be dispensed with, such that always both receiver modules 26a, 34a listen for signals 16a, 18a. In at least one further method step 112a a signal 16a, 18a emitted by a further monitoring unit 10a, 12a is detected by the receiver module 26a, 34a that is energetically more economical. In at least one further method step 114a the listening operation state is deactivated and the measuring operation state is activated, such that now both receiver modules 26a, 34a listen for the signals 16a, 18a. In at least one further method step 116a signals 16a, 18a are detected which form signal pairs 68a and are emitted from a same place, in particular from the further monitoring unit 10a, 12a. In at least one further method step 64a a runtime difference is determined between the signal of the signal pair 68a that constitutes a sound signal 16a and the signal of the signal pair 68a that constitutes an electromagnetic signal 18a. In at least one further method step 66a a distance value between an emission place of the two signals 16a, 18a and a reception place of the two signals 16a, 18a is determined on the basis of the obtained runtime difference. In at least one further method step 118a the received signals 16a, 18a and/or the evaluated data are stored in the memory module 58a. In at least one further method step 120a the alerting device 42a, 44a is activated depending on the determined distance value. The alerting device 42a, 44a is activated in the method step 120a if the determined distance value is smaller than the minimal distance 46a. If it is at a certain time no longer possible to reliably determine signal pairs 68a, the measuring operation state is deactivated in at least one further method step 126a and the first listening operation state or the second listening operation state is activated. Herein a choice between the first listening operation state and the second listening operation state is made based on a frequency of occurrence and/or on a number of electromagnetic signals 18a which are at the current point in time detected without the respectively allocated sound signal 16a. In at least one further method step 122a the memory module 58a is read out (for example after collecting the monitoring units 10a, 12a from the visitors when they leave the venue). In at least one further method step 124a contact tracking is carried out on the basis of the data read out from the monitoring units 10a, 12a.

FIGS. 7a to 7c exemplarily show an alerting process of the contact-monitoring system 40a by means of the distance-determining system 38a. In FIG. 7a the two monitoring units 10a, 12a, which are depicted as circles, are situated at a distance 22a from each other that is larger than the minimal distance 46a. There will be no alert in this case. In FIG. 7b the second monitoring unit 12a has approached the first monitoring unit 10a by such an amount that the minimal distance 46a is gone below. The first monitoring unit 10a continuously sends sound signals 16a and electromagnetic signals 18a. The electromagnetic signal 18a spreads considerably faster than the sound signal 16a (in FIGS. 7a to 7c depicted only schematically).

In FIG. 7b the electromagnetic signal 18a has already passed the second monitoring unit 12a and has been detected by the receiver unit 20a of the second monitoring unit 12a. If applicable, the reception of the electromagnetic signal 18a has resulted in the second monitoring unit 12a switching from the listening operation state to the measuring operation state. The time of reception of the electromagnetic signal 18a is recorded internally in the second monitoring unit 12a. If the receiver unit 20a then also receives the sound signal 16a, the time of reception is recorded as well and, after confirmation that the two signals 16a, 18a originate from the first monitoring unit 10a, the distance value is determined. In FIG. 7c both signals have passed the second monitoring unit 12a and have been registered by its receiving unit 20a. Following the determination of the distance value, the second monitoring unit 12a registers that the obtained distance value is smaller than the minimal distance 46a and initiates an alerting of the second monitoring unit 12a. The first monitoring unit 10a registers the same situation vice versa on the basis of the signals 16a, 18a emitted by the second monitoring unit 12a (not shown) and also initiates an alert. A carrier of the second monitoring unit 12a or a carrier of the first monitoring unit 10a perceives the alert and is able to counteract, i. e. to increase the distance 22a. It is possible for the carriers of the monitoring units 10a, 12a to realize, by the alert signal falling silent, when the respectively prescribed minimal distance 46a is being kept once more.

In FIG. 8 a further exemplary embodiment of the invention is shown. The following description and the drawings are essentially limited to the differences between the exemplary embodiments, wherein with regard to identically denominated components, in particular to components having the same reference numerals, principally the drawings and/or the description of the other exemplary embodiment, in particular of FIGS. 1 to 7c, may be referred to. In order to distinguish between the exemplary embodiments, the letter a has been added to the reference numerals of the exemplary embodiment in FIGS. 1 to 7c. In the exemplary embodiment of FIG. 8 the letter a has been substituted by the letter b.

FIG. 8 shows a schematic illustration of an alternative contact-monitoring system 40b. The alternative contact-monitoring system 40*b* is configured to be used in road traffic 136*b*. The alternative contact-monitoring system 40*b* is configured for a monitoring of convoy drives, for example in road traffic 136*b*. The contact-monitoring system 40*b* is realized as a convoy contact-monitoring system. The contact-monitoring system 40*b* is configured to monitor an observation of predetermined minimal distances 46*b* and/or predetermined maximal distances 132*b*. The alternative contact-monitoring system 40*b* is configured to monitor an observation of an optimal convoy distance in road traffic 136*b*.

The alternative contact-monitoring system 40*b* comprises an alternative distance-determining system 38*b*. The alternative distance-determining system 38*b* is configured to determine and/or monitor distances 22*b* of vehicles 138*b*, 146*b* in a convoy 140*b*. The alternative distance-determining system 38*b* is realized as a convoy distance-determining system. The alternative distance-determining system 38*b* comprises monitoring units 10*b*, 10'*b*, 12*b*, 12'*b*. The monitoring units 10*b*, 10'*b*, 12*b*, 12'*b* are realized as mobile monitoring units 10*b*, 10'*b*, 12*b*, 12'*b*. The monitoring units 10*b*, 10'*b*, 12*b*, 12'*b* are in each case assigned to an external unit 130*b*, 134*b*. The monitoring units 10*b*, 10'*b*, 12*b*, 12'*b* are in each case fastened at the external unit 130*b*, 134*b*. In the case shown in FIG. 8, the external units 130*b*, 134*b* are embodied as vehicles 138*b*, 146*b*, in particular as trucks. A first monitoring unit 10*b* of the mobile monitoring units 10*b*, 10'*b*, 12*b*, 12'*b* is arranged on a front side 142*b* of a first vehicle 138*b* that belongs to the convoy 140*b*. A second monitoring unit 12*b* of the mobile monitoring units 10*b*, 10'*b*, 12*b*, 12'*b* is arranged on a rear side 144*b* of a second vehicle 146*b* that also belongs to the convoy 140*b* and is enqueued in the convoy 140*b* directly in front of the first vehicle 138*b*.

The monitoring units 10*b*, 12*b* in each case comprise a transmitter unit 14*b* (not shown in detail in FIG. 8). The transmitter unit 14*b* is configured for emitting a sound signal 16*b* and an electromagnetic signal 18*b* (respectively not shown in detail in FIG. 8). The transmitter unit 14*b* is configured to emit, together at least with the electromagnetic signal 18*b*, at least one additional information, differing from an identifier, about the allocated monitoring unit 10*b*, 10'*b*, 12*b*, 12'*b* and/or about the external unit 130*b*, 134*b* which the respective monitoring unit 10*b*, 10'*b*, 12*b*, 12'*b* is assigned to. The additional information comprises at least one movement parameter of the emitting monitoring unit 10*b*, 10'*b*, 12*b*, 12'*b* and/or of the external unit 130*b*, 134*b* which the respective emitting monitoring unit 10*b*, 12*b*, 12'*b* is assigned to. The monitoring units 10*b*, 12*b* in each case comprise a receiver unit 20*b* (not shown in detail in FIG. 8). The receiver units are configured for receiving the sound signal 16*b*, the electromagnetic signal 18*b* and the additional information. The first monitoring unit 10*b*, which is arranged on the front side 142*b* of the first vehicle 138*b* belonging to the convoy 140*b*, emits a sound signal 16*b* and an electromagnetic signal 18*b* frontwards (towards the second vehicle 146*b*). The first monitoring unit 10*b*, which is arranged on the front side 142*b* of the first vehicle 138*b* belonging to the convoy 140*b*, emits an additional information about the first vehicle 138*b*, in particular about the movement state of the first vehicle 138*b*, at least frontwards (at least towards the second vehicle 146*b*). The second monitoring unit 12*b*, which is arranged on the rear side 144*b* of the second vehicle 146*b* belonging to the convoy 140*b*, emits a sound signal 16*b* and an electromagnetic signal 18*b* rearwards (towards the first vehicle 138*b*). The second monitoring unit 12*b*, which is arranged on the rear side 144*b* of the second vehicle 146*b* belonging to the convoy 140*b*, emits an additional information about the second vehicle 146*b*, in particular about the movement state of the second vehicle 146*b*, at least rearwards (at least towards the first vehicle 138*b*).

The second monitoring unit 12*b*, which is arranged on the rear side 144*b* of the second vehicle 146*b* belonging to the convoy 140*b*, receives the signals 16*b*, 18*b* and the information (movement parameter/s) emitted by the first monitoring unit 10*b*. The first monitoring unit 10*b*, which is arranged on the front side 142*b* of the first vehicle 138*b* belonging to the convoy 140*b*, receives the signals 16*b*, 18*b* and information (movement parameter/s) emitted by the second monitoring unit 12*b*. On the basis of the received signals 16*b*, 18*b*, the respective monitoring unit 10*b*, 12*b* determines the distance 22*b* between the vehicles 138*b*, 146*b*. On the basis of the received information (movement parameter/s), the respective monitoring unit 10*b*, 12*b* determines changes in driving operation states of the respective other vehicles 138*b*, 146*b*. On the basis of the determined distance 22*b*, an observation of the optimal convoy distance in the road traffic 136*b* is monitored.

On the basis of the determined distance 22*b* and the determined driving operation states, the vehicles 138*b*, 146*b* are controlled in such a way that the optimal convoy distance in road traffic 136*b* is achieved and/or maintained. The optimal convoy distance comprises a range between the minimal distance 46*b* and the maximal distance 132*b*. The distance range comprised by the optimal convoy distance is selected so as to be sufficiently large that the vehicle 138*b* driving behind is able to react sufficiently fast to changes in the driving operation state of the vehicle 146*b* driving in front (e. g. abrupt braking), and that at the same time a total air resistance of the two vehicles 138*b*, 146*b* can be reduced as far as possible. If the maximal distance 132*b* between the vehicles 138*b*, 146*b* is exceeded, an alerting device 42*b* (not shown in detail in FIG. 8), which is for example assigned to one or both vehicle/s 138*b*, 146*b*, may output an alert signal. If the minimal distance 46*b* between the vehicles 138*b*, 146*b* is gone below, the alerting device 42*b* may output an alert signal.

The monitoring units 10*b*, 12*b* in each case comprise a control and/or regulation unit 36*b* (not shown in detail in FIG. 8), which is configured, on the basis of the measured minimal distance 46*b*, on the basis of the measured maximal distance 132*b* and/or on the basis of further information (movement parameter/s) received together with the electromagnetic signal 18*b* and differing from an identifier, about the respectively other monitoring unit 10*b*, 12*b*, to output a control signal to the vehicle 138*b*, 146*b* assigned to the receiving monitoring unit 10*b*, 12*b*. The vehicles 138*b*, 146*b* with the monitoring units 10*b*, 10'*b*, 12*b*, 12'*b* are embodied as at least semi-autonomously driving vehicles 138*b*, 146, preferably as fully-autonomously driving vehicles 138*b*, 146*b*. The vehicles 138*b*, 146*b* driving at least semi-autonomously, preferably fully autonomously, are configured to implement the control signals generated on the basis of the measuring results of the monitoring units 10*b*, 10'*b*, 12*b*, 12'*b* into (semi-autonomous or fully autonomous) controlling of the vehicles 138*b*, 146*b*, for example into steering movements or into speed and/or acceleration adaptions. The contact-monitoring system 40*b* at the same time forms an alternative contact-tracking system 56*b* for a backtracking of convoy drives. The alternative contact-tracking system 56*b* is realized as a convoy-drive contact-tracking system. It is conceivable that the monitoring units 10*b*, 12*b* applied in the road traffic 136*b* comprise automatic or remote-controllable cleaning devices (not shown), which are at least configured to free the transmitter units 14*b* and/or the receiver units 20*b* from dirt (e. g. dust), water or ice, such that it is advantageously possible to ensure reliable emission/reception, in particular of the sound signals 16*b*.

FIG. 9 shows a schematic flow chart of a method for contact tracking within vehicle convoys 140*b* by means of the contact-tracking system 56*b*, in which an economical compensation is realized between individual vehicles 138*b*, 146*b* of the convoy 140*b*. In at least one method step 148*b* distances 22*b* between vehicles 138*b*, 146*b* of the convoy 140*b* are determined by the monitoring units 12*b* arranged at the vehicles 138*b*, 146*b*. The distances 22*b* are stored on the memory modules 58*b* of the monitoring units 10*b*, 12*b* together with the time intervals in which a respective vehicle 138*b*, 146*b* was part of the convoy 140*b* (convoy drive durations) and with the respective positions of the vehicles 138*b*, 146*b* within the convoy 140*b*. In at least one further method step 150*b* the determined and stored distance values and/or contact durations, in particular the durations of a minimal distance 46*b* or a maximal distance 132*b* being gone below/exceeded, preferably the convoy drive durations, are used for calculating an economical slipstream advantage/economical slipstream disadvantage arising therefrom for each vehicle 138*b*, 146*b*. Herein, among other things, especially the positions of the respective vehicles 138*b*, 146*b*, the distances 22*b* of the respective vehicles 138*b*, 146*b* from further vehicles 138*b*, 146*b* of the convoy 140*b*, the convoy drive durations of the respective vehicles 138*b*, 146*b* and/or the speeds of the respective vehicles 138*b*, 146*b* are taken into account. The calculation may be done online during an existence of the convoy 140*b* or subsequently when reading out at least one of the monitoring units 10*b*, 12*b*. In at least one further method step 152*b* a notification based on the calculation of the (economical) slipstream advantage which has arisen for at least one further vehicle 138*b* of the convoy 140*b* driving behind the vehicle 146*b*, which has in particular arisen for all vehicles 138*b*, 146*b* driving behind a leading vehicle (not shown) of the convoy 140*b*, is created by at least one vehicle 138*b*, 146*b* driving in the convoy 140*b*, in particular by the foremost vehicle 146*b* of the convoy 140*b* or by an external (readout) system. Said notification may comprise an invoice, a demand for payment or the like. In at least one further method step 154 the notification is transmitted to the respective further vehicle 138*b* of the convoy 140*b*. Alternatively, the notification may also be transmitted to a station allocated to the vehicle 138*b*, for example an allocated shipping company.

The invention claimed is:

1. A distance-determining system comprising:
   at least one first monitoring unit; and
   at least one second monitoring unit,
   wherein at least the first monitoring unit comprises a transmitter unit that is configured to emit a sound signal, and an electromagnetic signal,
   wherein at least the second monitoring unit comprises a receiver unit that is configured to receive the sound signal and the electromagnetic signal such that a distance between the first monitoring unit and the second monitoring unit can be determined on the basis of a runtime difference between the sound signal received by the receiver unit and the electromagnetic signal received by the receiver unit and allocated to the received sound signal,
   wherein the receiver unit comprises a sound receiver module for a reception of the sound signals and an EM receiver module for a reception of the electromagnetic signals, the receiver unit having one or several listening operation states and at least one measuring operation state that differs from the listening operation states,
   wherein in the listening operation states only the sound receiver module or only the EM receiver module is active, and
   wherein in the measuring operation state the sound receiver module and the EM receiver module are active, or the respective receiver module that is currently inactive is at least temporarily switched on in addition to a respective already active receiver module, or the respective receiver module that is active in the listening operation states is deactivated and the receiver module that is inactive in the respective listening operation states is activated.

2. The distance-determining system according to claim 1, wherein the sound signal emitted by the transmitter unit and the electromagnetic signal emitted by the transmitter unit in each case comprise an identifier, which is clearly allocatable to the respective transmitter unit.

3. The distance-determining system according to claim 1, wherein at least the second monitoring unit comprises a data processing unit, which is at least configured for determining the distance between the first monitoring unit and the second monitoring unit on the basis of the runtime difference of the sound signals and electromagnetic signals received by the receiver unit and emitted by the first monitoring unit.

4. The distance-determining system according to claim 3, wherein the determinable distance between the first monitoring unit and the second monitoring unit has an accuracy of at least 5 cm.

5. The distance-determining system according to claim 1, wherein the receiver unit comprises a sound receiver module for receiving the sound signals, which is configured to carry out an at least rough directional determination of the received signals.

6. The distance-determining system according to claim 5, wherein at least for carrying out the at least rough directional determination, the sound receiver module comprises two or more sound receiver elements.

7. The distance-determining system according to claim 6, wherein the sound receiver elements are arranged in the monitoring unit in such a way that they listen in directions that are different from one another.

8. The distance-determining system according to claim 1, wherein in a first listening operation state only that receiver module of the receiver unit is active whose energy consumption is lower.

9. The distance-determining system according to claim 1, wherein in a second listening operation state only that receiver module of the receiver unit is active whose reception range is smaller.

10. The distance-determining system according to claim 1, wherein at least the second monitoring unit comprises a control and/or regulation unit which is configured, upon detection of a signal by the receiver module that is respectively active in a currently set listening operation, to switch the receiver unit from one of the listening operation states into a measuring operation state.

11. The distance-determining system according to claim 10, wherein the control and/or regulation unit is configured, in a listening operation state in which only the EM receiver module is active, to switch the receiver unit from the listening operation state into the measuring operation state depending on a limit signal intensity of the received electromagnetic signal.

12. A contact-monitoring system at least for a monitoring of an observation of given distances or of minimal distances and/or maximal distances, with a distance-determining system, comprising:
at least one first monitoring unit; and
at least one second monitoring unit,
wherein at least the first monitoring unit comprises a transmitter unit that is configured to emit a sound signal, and an electromagnetic signal,
wherein at least the second monitoring unit comprises a receiver unit that is configured to receive the sound signal and the electromagnetic signal such that a distance between the first monitoring unit and the second monitoring unit can be determined on the basis of a runtime difference between the sound signal received by the receiver unit and the electromagnetic signal received by the receiver unit and allocated to the received sound signal,
wherein at least the second monitoring unit comprises an alerting device or is connected to an external alerting device in terms of data transmission technology, the alerting device being configured to output an alert signal if a predeterminable minimal distance from the first monitoring unit is gone below, and/or if a predeterminable maximal distance from the first monitoring unit is exceeded,
with the contact-monitoring system further comprising a grouping function configured to make an activation of the alerting device dependent on a received identifier which is contained in a signal pair comprising a sound signal and an electromagnetic signal and which is bijectively assigned to a further monitoring unit grouped in a common group with the second monitoring unit.

13. The contact-monitoring system according to claim 12, wherein the alerting device comprises an optical signal generator, an acoustical signal generator and/or a mechanical signal generator.

14. The contact-monitoring system according to claim 12, wherein the monitoring units in each case comprise a fastening device for fastening the monitoring unit.

15. The contact-monitoring system according to claim 12, wherein the monitoring units in each case additionally comprise an ultra-wideband localization device.

16. The contact-monitoring system according to claim 12, comprising at least two mobile monitoring units, which are in each case assigned to persons, and in each case comprise the transmitter unit and the receiver unit.

17. A contact-tracking system at least for a back-tracking of contacts, in particular of chains of infection, with a distance-determining system, with at least one first monitoring unit and with at least one second monitoring unit, wherein at least the first monitoring unit comprises a transmitter unit that is configured to emit a sound signal, and an electromagnetic signal, wherein at least the second monitoring unit comprises a receiver unit that is configured to receive the sound signal and the electromagnetic signal such that a distance between the first monitoring unit and the second monitoring unit can be determined on the basis of a runtime difference between the sound signal received by the receiver unit and the electromagnetic signal received by the receiver unit and allocated to the received sound signal, with the contact-tracking system further comprising:
at least one mobile monitoring unit, which is assigned to a person, with the transmitter unit and with the receiver unit, and
at least one stationary further monitoring unit, which is fixedly installed in an environment accessible for persons, with a transmitter unit and with a receiver unit, and a plurality of stationary monitoring units allocated to a common space, wherein the stationary monitoring units are arranged in the common space such that each point of the common space is always situated within ranges of the transmitter units of at least two stationary monitoring units, such that a bilateration of a position of the at least one mobile monitoring unit that is moved in the space is enabled.

18. The contact-tracking system according to claim 17, wherein at least the second monitoring unit comprises a memory module which is configured to register received signals for later analysis.

19. The contact-tracking system according to claim 18, wherein at least the second monitoring unit is at least configured to store in the memory module a time of a signal reception, a signal intensity of a signal reception, a distance from a further monitoring unit obtained on the basis of received signals, a duration of a minimal distance or a maximal distance being exceeded/gone below, a number of events of the minimal distance or the maximal distance being exceeded/gone below, and/or an identifier belonging to a further monitoring unit that emits the received signal.

20. The contact-tracking system according to claim 18, wherein at least the second monitoring unit comprises a wireless or wire-bound read-out interface for reading out data stored in the memory module.

21. A method for distance determination, by means of a distance-determining system, with at least one first monitoring unit and with at least one second monitoring unit, wherein at least the first monitoring unit comprises a transmitter unit that is configured to emit a sound signal, and an electromagnetic signal, wherein at least the second monitoring unit comprises a receiver unit that is configured to receive the sound signal and the electromagnetic signal such that a distance between the first monitoring unit and the second monitoring unit can be determined on the basis of a runtime difference between the sound signal received by the receiver unit and the electromagnetic signal received by the receiver unit and allocated to the received sound signal,
wherein distance values and/or contact durations or durations of a minimal distance or a maximal distance being exceeded or gone below, which were determined relative to at least one further monitoring unit by means of the distance-determining system or by means of a contact-tracking system, are used for a calculation of an infection risk arising therefrom.

22. The method according to claim 21, wherein in at least one method step a runtime difference is determined between a sound signal, and an electromagnetic signal, and that then in a further method step a distance value between an emission place of the two signals and a reception place of the two signals is obtained on the basis of the determined runtime difference.

* * * * *